(12) United States Patent
Taylor et al.

(10) Patent No.: US 9,037,975 B1
(45) Date of Patent: May 19, 2015

(54) ZOOMING INTERACTION TRACKING AND POPULARITY DETERMINATION

(75) Inventors: Brett R. Taylor, Bainbridge Island, WA (US); Kevin E. Keller, Sunnyvale, CA (US); Andrew Hayden, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/371,246

(22) Filed: Feb. 10, 2012

(51) Int. Cl.
*G06F 3/00* (2006.01)
*G06F 17/30* (2006.01)

(52) U.S. Cl.
CPC ............... *G06F 17/30905* (2013.01)

(58) Field of Classification Search
USPC .......................................................... 715/733
See application file for complete search history.

(56) References Cited

U.S. PATENT DOCUMENTS

| | | | |
|---|---|---|---|
| 5,634,064 A | 5/1997 | Warnock et al. | |
| 5,872,850 A * | 2/1999 | Klein et al. | 705/51 |
| 5,961,593 A | 10/1999 | Gabber et al. | |
| 6,049,812 A | 4/2000 | Bertram et al. | |
| 6,108,637 A | 8/2000 | Blumenau | |
| 6,138,156 A | 10/2000 | Fletcher et al. | |
| 6,195,679 B1 | 2/2001 | Bauersfeld et al. | |
| 6,430,624 B1 | 8/2002 | Jamtgaard et al. | |
| 6,549,941 B1 | 4/2003 | Jaquith et al. | |
| 6,560,620 B1 | 5/2003 | Ching | |
| 6,625,624 B1 | 9/2003 | Chen et al. | |
| 6,704,024 B2 | 3/2004 | Robotham et al. | |
| 6,785,864 B1 | 8/2004 | Te et al. | |
| 6,871,236 B2 | 3/2005 | Fishman et al. | |
| 6,944,665 B2 | 9/2005 | Brown et al. | |
| 6,963,850 B1 | 11/2005 | Bezos et al. | |
| 7,003,442 B1 | 2/2006 | Tsuda | |
| 7,051,084 B1 | 5/2006 | Hayton et al. | |
| 7,054,952 B1 | 5/2006 | Schwerdtfeger et al. | |
| 7,085,736 B2 | 8/2006 | Keezer et al. | |
| 7,159,023 B2 | 1/2007 | Tufts | |

(Continued)

FOREIGN PATENT DOCUMENTS

WO      WO 2013/003631 A2      1/2013

OTHER PUBLICATIONS

Bango, Rey "How JS & Ajax work in Opera Mini 4", Nov. 2, 2007, XP055050107, Retrieved from the Internet.

(Continued)

*Primary Examiner* — William Bashore
*Assistant Examiner* — Rayeez Chowdhury
(74) *Attorney, Agent, or Firm* — Knobbe, Martens, Olson & Bear, LLP

(57) ABSTRACT

Various features are provided for assisting users in efficiently locating and viewing network content of interest, including but not limited to particular portions of web pages. The features are particularly useful for users of mobile computing devices having a limited display size, but may be used with any type of client device. Some features identify popular content items by collectively analyzing the interactive behaviors of a population of users, such as zooming interactions. The results of such analysis can be used in various ways to improve users' browsing experiences. For example, popular content items can be highlighted on a web page, an option to zoom in automatically on popular content items can be provided, popular content items may be rendered at relatively high resolution, and caching of content items may be based partly on a measure of their popularity.

29 Claims, 19 Drawing Sheets

(56) References Cited

U.S. PATENT DOCUMENTS

| | | | |
|---|---|---|---|
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,543,059 B2 | 6/2009 | Johnson et al. | |
| 7,792,944 B2 | 9/2010 | DeSantis et al. | |
| 7,831,582 B1 | 11/2010 | Scofield et al. | |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,103,742 B1 | 1/2012 | Green | |
| 8,185,621 B2 | 5/2012 | Kasha | |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 2001/0039490 A1 | 11/2001 | Verbitsky et al. | |
| 2002/0030703 A1 | 3/2002 | Robertson et al. | |
| 2002/0040395 A1* | 4/2002 | Davis et al. | 709/224 |
| 2002/0194302 A1* | 12/2002 | Blumberg | 709/217 |
| 2003/0023712 A1 | 1/2003 | Zhao et al. | |
| 2003/0041106 A1 | 2/2003 | Tuli | |
| 2004/0083294 A1 | 4/2004 | Lewis | |
| 2004/0139208 A1 | 7/2004 | Tuli | |
| 2004/0181613 A1* | 9/2004 | Hashimoto et al. | 710/1 |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2004/0267723 A1* | 12/2004 | Bharat | 707/3 |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2006/0085766 A1 | 4/2006 | Dominowska et al. | |
| 2006/0095336 A1 | 5/2006 | Heckerman et al. | |
| 2006/0122889 A1 | 6/2006 | Burdick et al. | |
| 2006/0168510 A1 | 7/2006 | Bryar et al. | |
| 2006/0184421 A1 | 8/2006 | Lipsky et al. | |
| 2006/0248442 A1 | 11/2006 | Rosenstein et al. | |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0094241 A1 | 4/2007 | Blackwell et al. | |
| 2007/0124693 A1 | 5/2007 | Dominowska et al. | |
| 2007/0139430 A1 | 6/2007 | Korn et al. | |
| 2007/0226044 A1* | 9/2007 | Hanson | 705/10 |
| 2007/0240160 A1 | 10/2007 | Paterson-Jones et al. | |
| 2007/0288589 A1 | 12/2007 | Chen et al. | |
| 2007/0288855 A1 | 12/2007 | Rohrabaugh et al. | |
| 2008/0028334 A1 | 1/2008 | De Mes | |
| 2008/0086264 A1* | 4/2008 | Fisher | 701/209 |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0320225 A1 | 12/2008 | Panzer et al. | |
| 2009/0012969 A1 | 1/2009 | Rail et al. | |
| 2009/0164924 A1 | 6/2009 | Flake et al. | |
| 2009/0204478 A1 | 8/2009 | Kaib et al. | |
| 2009/0217199 A1 | 8/2009 | Hara et al. | |
| 2009/0248680 A1 | 10/2009 | Kalavade | |
| 2009/0254867 A1* | 10/2009 | Farouki et al. | 715/853 |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0036740 A1 | 2/2010 | Barashi | |
| 2010/0057639 A1 | 3/2010 | Schwarz et al. | |
| 2010/0125507 A1* | 5/2010 | Tarantino et al. | 705/14.69 |
| 2010/0131594 A1 | 5/2010 | Kashimoto | |
| 2010/0138293 A1 | 6/2010 | Ramer et al. | |
| 2010/0218106 A1 | 8/2010 | Chen et al. | |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1* | 1/2011 | Lee | 715/702 |
| 2011/0029854 A1 | 2/2011 | Nashi et al. | |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0246873 A1 | 10/2011 | Tolle et al. | |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0072821 A1 | 3/2012 | Bowling | |
| 2012/0084644 A1* | 4/2012 | Robert et al. | 715/255 |
| 2012/0096365 A1 | 4/2012 | Wilkinson et al. | |
| 2012/0110017 A1 | 5/2012 | Gu et al. | |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0284629 A1 | 11/2012 | Peters et al. | |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0080611 A1 | 3/2013 | Li et al. | |
| 2013/0198641 A1 | 8/2013 | Brownlow et al. | |

OTHER PUBLICATIONS

Brinkmann, M, "Record and Share your browser history with Hooeey," ghacks.net, Feb. 26, 2008, 6 pages, printed on Jan. 25, 2013.

Considine, A, "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M, Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

Rao, H.C.-H.,et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

(56) References Cited

OTHER PUBLICATIONS

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

* cited by examiner

US 9,037,975 B1

ZOOMING INTERACTION TRACKING AND POPULARITY DETERMINATION

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a web page from a server computing device via the Internet. The user computing device can be referred to as a client computing device and the server computing device can be referred to as a content provider.

From the perspective of a user utilizing a client computing device, the text of a displayed web page may not be large enough to read, or an image may not be large enough to see an adequate amount of detail. Such display issues may be especially apparent on mobile computing devices with limited display areas, such as netbooks, tablets, smartphones, e-readers, media players, and the like. Users can zoom the display on a portion of the web page to provide a more satisfactory view. For example, if the client computing device is configured with a touch screen, a user may perform a zoom touch gesture to zoom-in on a portion of interest. Because the task of zooming in and out tends to be burdensome, users are sometimes reluctant to use their mobile devices to browse web pages and other network content.

BRIEF DESCRIPTION OF THE DRAWINGS

Embodiments of various inventive features will now be described with reference to the following drawings, wherein.

DETAILED DESCRIPTION OF SPECIFIC EMBODIMENTS

Figure 1A:
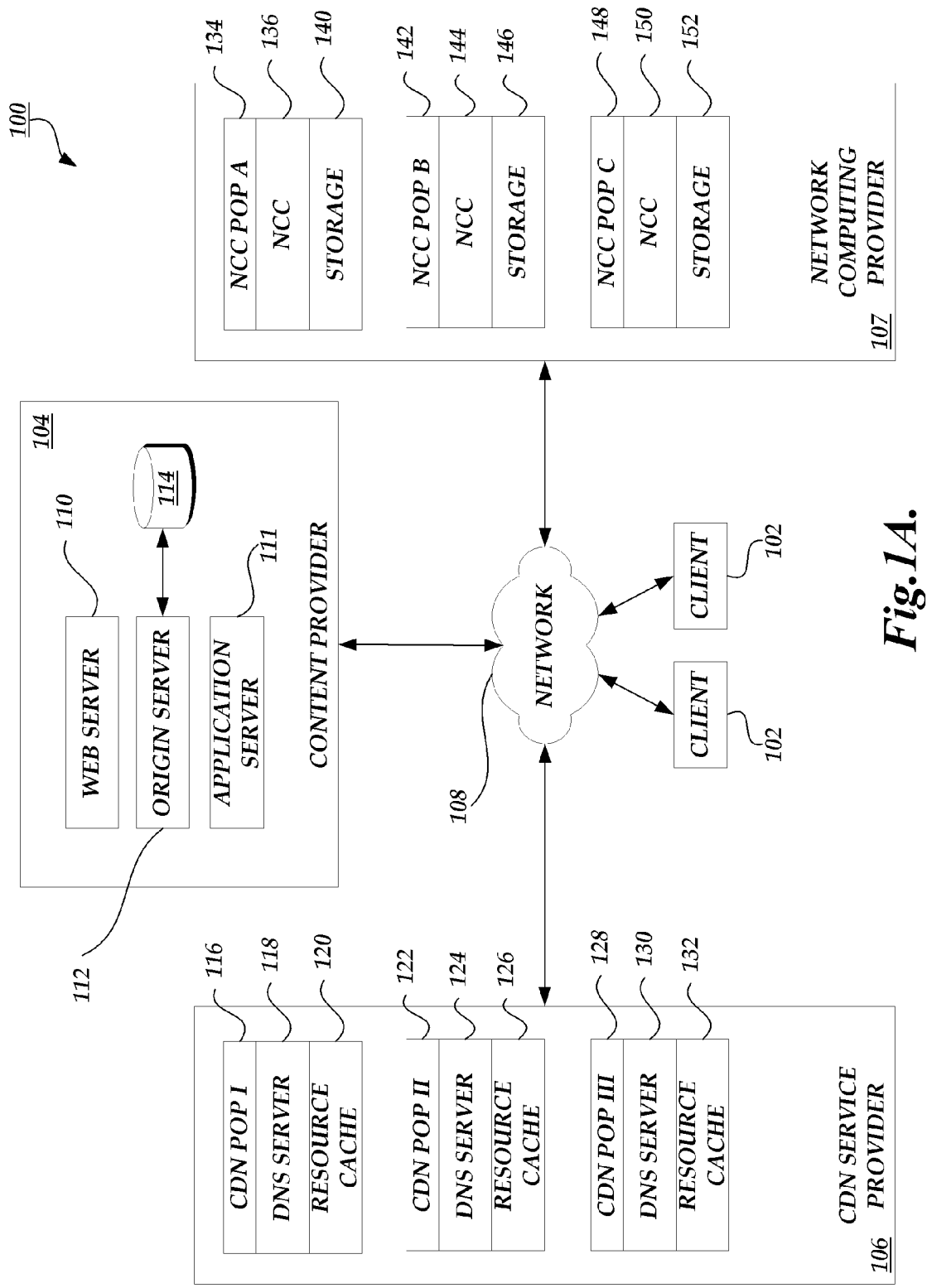
FIG. 1A is a block diagram illustrative of a content delivery environment including a number of client computing devices, content provider, a content delivery network service provider, and a network computing provider.

Various features are disclosed for assisting users in efficiently locating and viewing network content of interest, including but not limited to particular portions of web pages. The disclosed features are particularly useful for users of mobile computing devices having a limited display size (e.g., smartphones and tablets), but may, in some embodiments, be used with other types of client devices (e.g., desktop computers). Some of the disclosed features identify popular content items by collectively analyzing the interactive behaviors, such as but not limited to zooming behaviors, of a population of users. The results of such analyses can be used in various ways to improve users' browsing experiences. For example, popular content items can be highlighted on a web page, and an option to zoom in automatically on popular content items can be provided. In another example, popular content items such as images may be rendered at relatively high resolution compared to images associated with a lower popularity, and caching of content items may be based partly on a measure of their popularity. Some of the disclosed features may be implemented in-part through the use of a special browser application.

The remainder of the disclosure is arranged generally as follows. Initially, an example content delivery environment will be described with reference to FIGS. 1A, 2-6, and 8-11. The disclosed content delivery environment represents one non-limiting example of an environment in which the disclosed navigation and behavioral analysis features may be implemented. Portions of this disclosure of the example content environment are bodily incorporated from U.S. patent application Ser. No. 13/174,589, the disclosure of which is hereby incorporated by reference. As will be recognized, the disclosed navigation and behavioral analysis features can be implemented in other environments, including, in some cases, environments that do not include a proxy server or a content delivery network. Following the description of the example environment, the various navigation and behavioral analysis features will be described with reference to FIGS. 1B, 7A-7E, and 12-14.

With reference to an illustrative example, a user may cause a client computing device configured with a touch screen to load a software browser application (henceforth referred to as a "browser") for accessing content provided by one or more content providers. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, a user may interact with the interface controls via the touch screen.

Subsequent to the browser being loaded, a user or automated browser process may cause the client computing device to transmit a request to access content from a content provider. For example, the user may select or enter a URL, (e.g., http://www.xyzwebsite.com) into a browser window, causing the client computing device to transmit a request for the web site to a network computing provider. In an illustrative embodiment, responsive to the request received from the client computing device, the network computing provider may instantiate or cause to have instantiated one or more computing components, such as a proxy server, associated with the network computing provider that will host a browser software application. For example, the network computing provider can instantiate, or cause to have instantiated, an instance of a virtual machine that includes a software browser application capable of requesting resources from a communication network.

Using the instantiated network computing components, the network computing provider may request the identified network resource(s) from one or more content providers, a content delivery network, or a local or associated cache component. A proxy server or other component of the instantiated network computing component can determine a browsing or processing configuration for the requested content based on previously received zooming interaction data. Illustratively, the proxy server may process and transmit popular portions of network content on an expedited basis while omitting or reducing the resolution of less popular portions. The popularity can be determined based on user zooming interactions with the requested content or with related content.

A user of a client computing device in receipt of the network content may zoom the display or otherwise focus on a portion of the network content. The browser may include a zooming interaction tracking module that transmits information about the zooming interaction to the network computing provider. Illustratively, the network computing provider may aggregate information from any number of users to determine a popularity of any portion of the content based on the zooming interactions. The network computing provider may additionally use demographic characteristics, content requests, or other data to determine related resources, and may facilitate client computing device navigation to the related resources.

FIG. 1A is a block diagram illustrative of a networked computing environment 100 for the management and processing of content requests. As illustrated in FIG. 1A, the networked computing environment 100 includes a number of client computing devices 102 (generally referred to as clients) for requesting content and content processing from a content provider 104, content delivery network (CDN) service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1A corresponds to a logical association of one or more computing devices associated with a content provider. Specifically, the content provider 104 can include a web server component 110 corresponding to one or more server computing devices for obtaining and processing requests for content (such as web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1A, the content provider 104 can be associated with one or more DNS name server components that would be authoritative to resolve client computing device DNS queries corresponding to a domain of the content provider.

With continued reference to FIG. 1A, the networked computing environment 100 can further include a CDN service provider 106 in communication with the one or more client computing devices 102 and other service providers via the communication network 108. The CDN service provider 106 illustrated in FIG. 1A corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1A as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1A, the networked computing environment 100 can also include a network computing provider 107 in communication with the one or more client computing devices 102, the CDN service provider 106, and the content provider 104 via the communication network 108. The network computing provider 107 illustrated in FIG. 1A also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1A as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

Figure 1B:
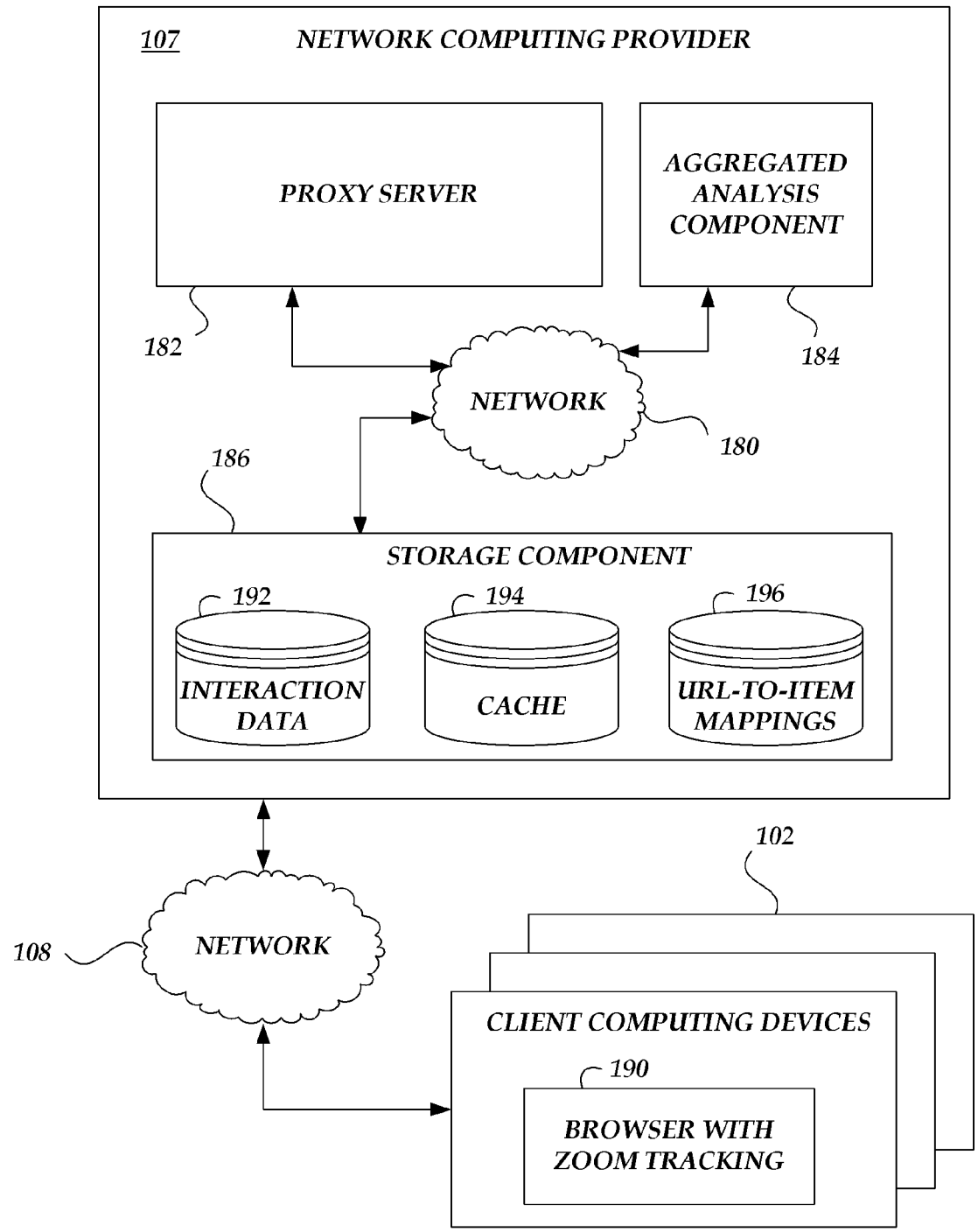
FIG. 1B is a block diagram of a network computing provider configured to manage virtual network computing providers that are logically separate from one another and from the rest of the network computing provider.

FIG. 1B is a block diagram schematically illustrating an example of a network computing provider 107, described above with respect to FIG. 1A, that can provide computing resources to multiple client computing devices 102 via a communication network 108. For example, and as described in detail herein, the network computing provider 107 can manage requests from a client computing device 102 to retrieve a network resource, such as a web page, image, video file, applet, animation, document, or other content object of a web site, from a content source, such as a content provider 104 or CDN service provider 106 as illustrated in FIG. 1A. The network computing provider 107, or some component thereof such as a proxy server 182, can be configured to process requests from client computing devices 102, retrieve responsive resources from content sources, and determine browsing configurations. Under some browsing configurations, the proxy server 182 can process some or all of the requested network resource, either exclusively or in parallel with the client computing device 102. The result of such browsing configurations can be an improvement in performance speed, reliability, privacy, etc., when compared to the client computing device 102 processing the network resources exclusively.

The network computing provider 107 can include a proxy server 182, an aggregated analysis component 184, and a storage component 186. Each component can be implemented as hardware or as software executing on computing hardware, such as a server. In addition, each component may include one or more physical servers or other computing devices, including devices that are geographically remote from one another. The components can be combined on one server or separated individually or into groups on several servers. In some embodiments, the network computing provider 107 can include additional or fewer components, multiple instances of the same component, etc. For example, the network computing provider 107 can include any number of storage components 186. The storage components 186 can be configured to store interaction data 192 representing client computing device 102 interactions with network content, a cache 194 of popular, previously accessed, or related network content, mappings 196 of URLs to content items and other information about individual network resources, etc. The proxy server 182, aggregated analysis component 184, and storage component 186 can communicate with each other over a network 180. The network 180 may, for example, be a publicly accessible network of linked networks, possibly operated by various distinct parties, such as the Internet. In other embodiments, the network 180 may be a private network, such as, for example, a corporate or university network that is wholly or partially inaccessible to non-privileged users. In still other embodiments, the network 180 may include a private network, personal area network, local area network, wide area network, cable network, satellite network, cellular telephone network, etc. or combination thereof, each with access to and/or from the Internet.

In operation, a user of a client computing device 102 can use a browser 190 to request a network resource, such as a web page. As described herein, the request can be transmitted to a network computing provider 107 instead of directly to a content source, and the network computing provider 107, or some component thereof such as the proxy server 182, can retrieve, process, and transmit the requested content to the client computing device 102. In some embodiments, the client computing device 102 can be configured with a display that has limited viewable area. For example, the client computing device 102 can be a netbook, tablet, smartphone, e-reader, media player, etc. configured with a small display. When viewing the web page on such a display, the user may zoom in on portions of the content in order to obtain a satisfactory view. For example, the user may zoom on a portion of text in order to read it, on an image in order to see more detail, etc. The browser 190 of the client computing device 102 can include a zoom tracking module which tracks such zooming behaviors and determines the area or content item on which the user zoomed. Some client computing devices 102 may include a camera that tracks user eye movements, and in such cases the browser 190 may use data regarding such eye movements to determine the area or content item on which the user zoomed.

The browser 190 may transmit data to the network computing provider 107 indicating which content items a user zoomed on, for how long the user zoomed on them, which pages the user navigated from in order to arrive at the page on which the user zoomed, etc. For example, the browser 190 can use coordinates of the zoomed display in conjunction with data about the layout of the page, such as the HTML tags of the page, to determine which content item or portion of the page the display has been zoomed in on. In some embodiments, the browser 190 may transmit the coordinates instead of data indicating the content item zoomed in on, and a component of the network computing provider 107 can determine the corresponding content item. In some embodiments, a screen shot, hash, or other representation of the content item on which the user zoomed can be sent to the network computing provider 107. In some embodiments, the user need not use a browser 190 to view and interact with network content. For example, a user may view a document in a word processing application and scroll to a page or zoom on a portion of the document. The word processing application, the operating system of the client computing device 102, or some other component can track the scrolling or zooming interactions and transmit data to the network computing provider 107 indicating which content items a user zoomed in on or scrolled to, how long the user viewed the item or page, etc.

Upon receipt, the network computing provider 107 can store the data in a storage component 186 and invoke the aggregated analysis component 184 to analyze data received from any number of browsers 190 to determine which portions of web pages are most popular. For example, the interaction data can be stored in an interaction data 192 portion of the storage component 186, and the aggregated analysis component 184 can retrieve the data to process it. In some embodiments, the interaction data can be passed directly to aggregated analysis component 184 upon receipt by the network computing provider 107, and the aggregated analysis component 184 can store the data in storage component 186. In some embodiments the aggregated analysis component 184 is invoked to update popularity determinations each time interaction data is received from a client computing device 102. In some embodiments, the aggregated analysis component 184 executes on a schedule, or in response to receiving a request for a page with associated interaction data.

Figure 7A:
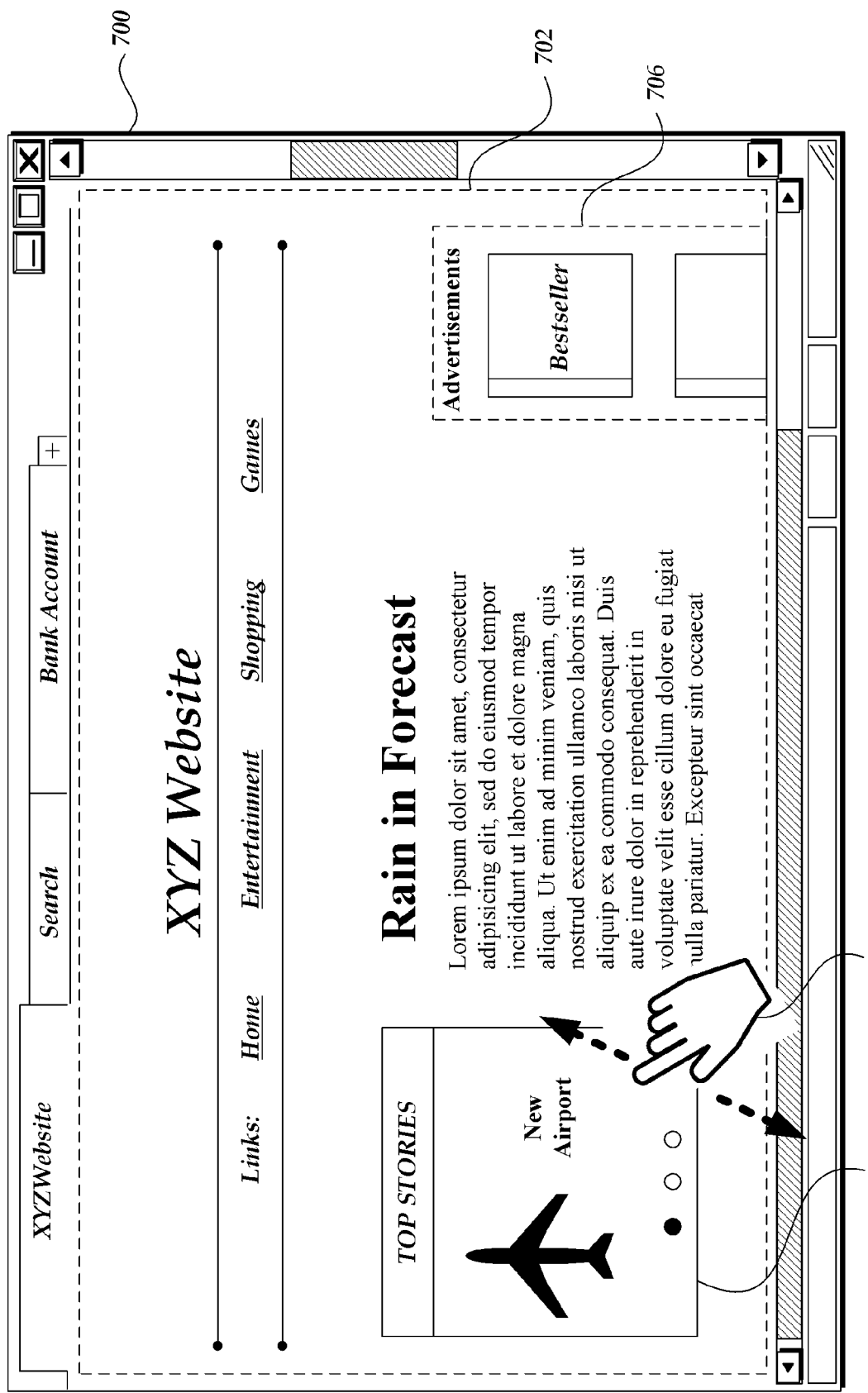
FIG. 7A is a user interface diagram depicting an illustrative browser interface and display of a content page.

The aggregated analysis component 184 can calculate a relative ranking of popular content items on a web page based on interaction data received from a number of client computing devices 102. For example, a web page may have two content items 706 and 708, as illustrated in FIG. 7A, and 60% of users zoom in on item 708 while only 5% of users zoom in on 708 and 35% of users do not zoom in on either item. In such a case, the aggregated analysis component 184 may assign item 708 a high popularity ranking or score, and assign item 706 a lower ranking or score in comparison. In some embodiments, the popularity rankings of content items on a page are not relative to each other, but instead reflect popularity among content items on a number of different web pages. The popularity rankings can be stored in the URL-to-item mappings 196 portion of the data storage component 186. The URL-to-item mappings 196 portion of storage can contain a listing of web pages and their content items, and one or more popularity rankings can be stored for each content item. For example, the relative ranking of each content item on the page can be stored. In addition, data regarding the content items that a particular user or group of users zoom in on can be stored and/or used to calculate a popularity or relevance score for the particular user or group of users sharing one or more characteristics. In some embodiments, the proxy server 182 can utilize such data to personalize the processing or rendering of web pages for a user or group of users. For example, the proxy server 182 can process popular content items first and deliver those to client computing devices 102 before processing less popular content items of the web page, or alter the appearance of the web page such that popular items are accented while unpopular items are not accented. In another example, the proxy server 182 can replace unpopular portions with more popular portions, or provide data to content providers 104 regarding the relative popularity of portions of their pages. Content providers 104 can use such information to replace unpopular content or otherwise alter the web pages they provide.

The network computing provider 107 may receive and store additional data about client computing devices 102, their users, and requested network content. For example, a browser 190 may transmit navigation data to the network computing provider 107 in addition to the interaction data. The navigation data can indicate the web page that the user navigated from to the web page the user zoomed in on. Such data can be used by the aggregated analysis component 184 or some other component to determine which page or pages may be related to a popular content item, which content items on those related pages are most popular, which popular and/or related web pages to recommend to a user based on the user's own navigation and zooming activity, etc. For example, the aggregated analysis component 184 may detect that users who arrive from web pages of "news" sites tend to focus on a particular content item, but that users who arrive from web pages of "shopping" sites tend to focus on a different content item. In another example, the data can be used to further personalize related and popular content items by considering which web pages a user's social network contacts visit. If a statistically significant number of contacts have visited a web page or zoomed in on a content item, the web page or content item may be included in recommendations regardless of its popularity among all users generally. In some embodiments the network computing provider 107 may have access to such navigation data without receiving it from a browser 190 of a client computing device 102. For example, when the browsers 190 send requests for web pages to the proxy server 182 or some other component of the network computing provider

107 to process and fulfill, the requests can be stored in a storage component 186 for use in determining related web pages.

The network computing provider 107 may have access to demographic data about a user or client computing device 102, and can use the data in the popularity and related page determinations. For example, the browser 190 may store user demographic data or have access to user demographic data on the client computing device 102, and the browser 190 can transmit the data to the network computing provider 107, similar to the navigation data described above. In some embodiments, the user may have a user account with the network computing provider 107, and the network computing provider 107 maintains user demographic data in a storage component 186. User accounts may be available to the public, for example to users who purchase or otherwise sign up for the services of a network computing provider 107 which provide network access service. In some cases, the user account may be a private account, such as an active directory user account provided to users within a private corporate or university network. The browser 190 may be configured to transmit a username or other identifier to the network computing provider 107 along with interaction data, web page requests, etc. The aggregated analysis component 184 or some other component of the network computing provider 107 can then use the identifier to retrieve demographic data from the storage component 186 for use in determining the popularity of content items or web pages, related web pages, etc. In one embodiment, the network computing provider 107 can provide recommendations of related pages when a user views a web page. In another embodiment, the network computing provider 107 can provide addresses of related pages when a user zooms in on a content item. The recommendations of related pages can be based on interaction data, navigation data, and demographic data from other users with similar demographic data.

The network computing provider 107 can cache resources associated with popular content items, popular pages, related pages, and other resources in the cache 194. Caching such resources can reduce the time it takes to respond to a subsequent request for the web page of which a popular content item is a part. As illustrated in FIG. 1B, the cache 194 can be located in the same storage component 186 as the interaction data 192 and other data. In some embodiments, the cache be located on a separate storage component 186, on the same physical computing component as the proxy server 182, on some other component of the network computing provider 107, or at some third party content host, such as a CDN service provider 106 as illustrated in FIG. 1A.

As described herein, a component of the network computing provider 107, such as the proxy server 182, can be configured to retrieve requested content and determine which processing tasks to perform in addition to, or instead of, the processing tasks normally performed by a browser 190 on a client computing device 102. The proxy server 182 may include an instance of a browser for performing the same or similar processing at the network computing provider 107. In some embodiments, the proxy server 182 can utilize popularity rankings to determine which processing tasks to perform at the network computing provider 107. For example, if item 708 of the example above, as illustrated in FIG. 7A, has a high popularity ranking or score, the proxy server 182 can ensure that the quality of the item 708 is maintained at a high level and that the item 708 is transmitted to the client computing device 102 for display before less popular items, such as item 706 in the example above. In addition, the proxy server 182 may reduce the quality of item 706 (such as by reducing its resolution in the case of an image or video) prior to transmitting it to the client computing device 102 because it is unlikely to be zoomed in on. In some embodiments, items with low or zero popularity can be omitted altogether. These features can reduce page load times experienced by users of client computing devices 102. Such a reduction that takes on greater importance in mobile, wireless, and other bandwidth-restricted environments, where a reduction in the transmission of data helps to conserve limited resources, including bandwidth and battery life.

With reference now to FIGS. 2-6, the interaction between various components of the networked computing environment 100 of FIG. 1A will be illustrated. Specifically, FIGS. 2-6 illustrate the interaction between various components of the networked computing environment 100 for the exchange of content between a client computing device 102 and a content provider 104 via the network computing provider 107. For purposes of the example, however, the illustrations have been simplified such that many of the components utilized to facilitate communications are not shown. One skilled in the relevant art will appreciate that such components can be utilized and that additional interactions would accordingly occur without departing from the spirit and scope of the present disclosure.

Figure 2:
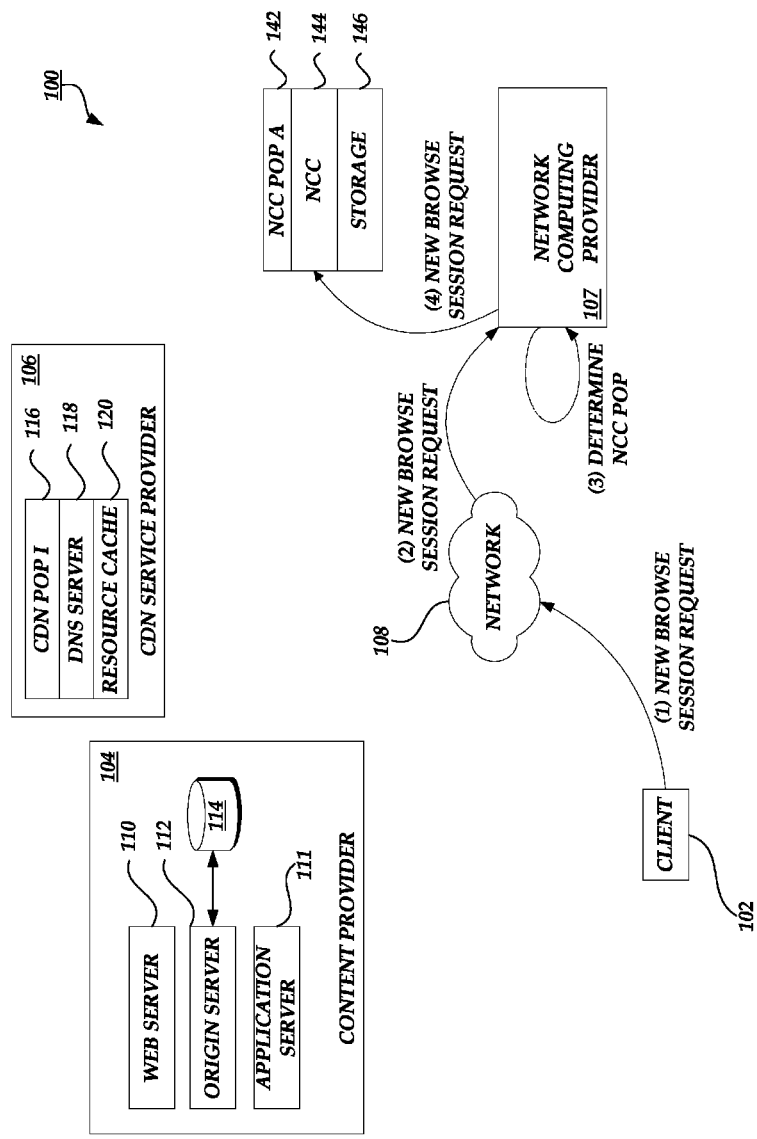
FIG. 2 is a block diagram of the content delivery environment of FIG. 1A illustrating the generation and processing of a new browse session request from a client computing device to a network computing provider.

With reference to FIG. 2, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
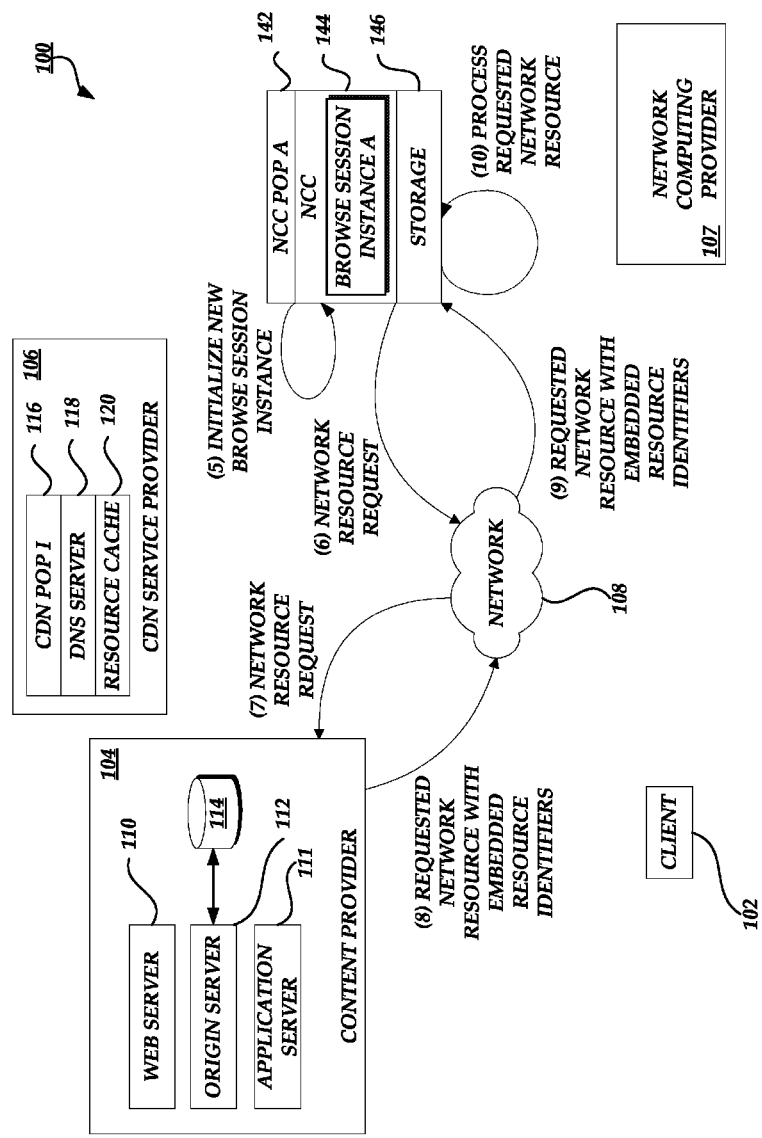
FIG. 3 is a block diagram of the content delivery environment of FIG. 1A illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a web page, such as "http://www.xyzsite.com/default.htm." NCC POP 142 may resolve the URL to an IP address through a DNS resolver associated with the network computing provider (not shown), and may request the web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
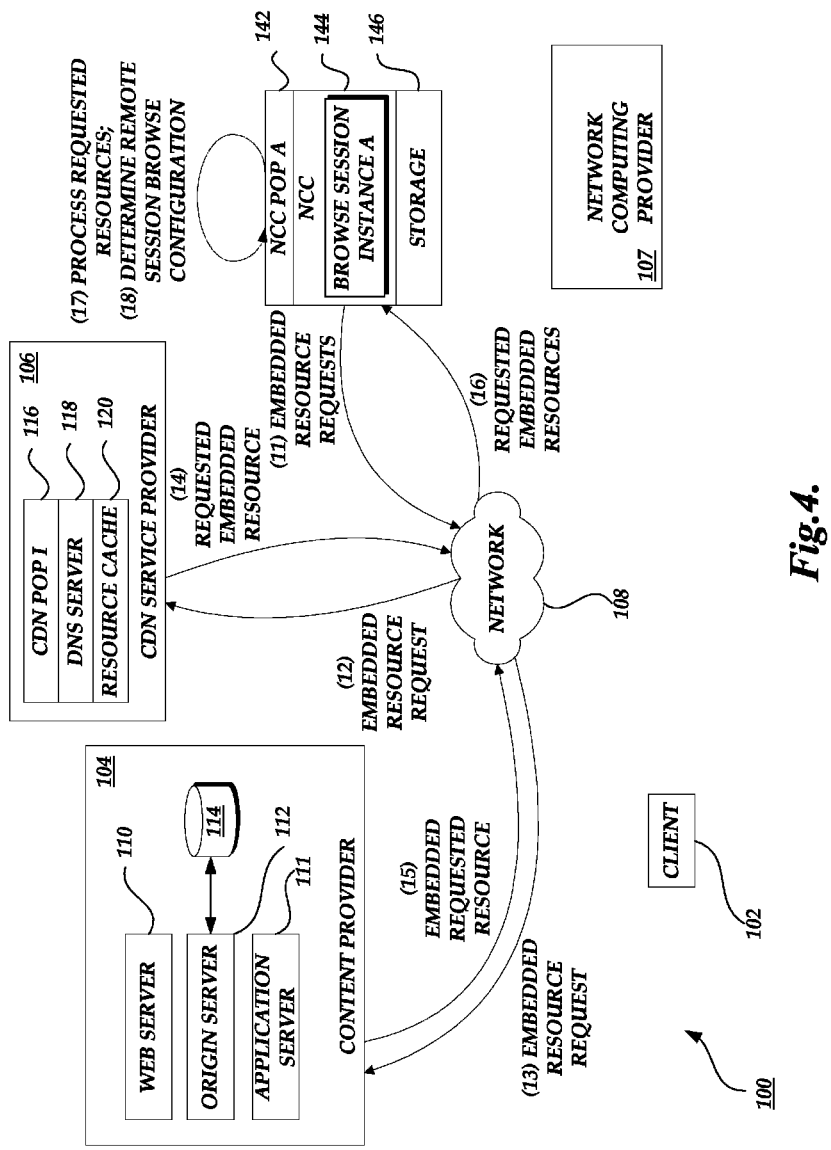
FIG. 4 is a block diagram of the content delivery environment of FIG. 1A illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a web page) as described in FIG. 3 above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
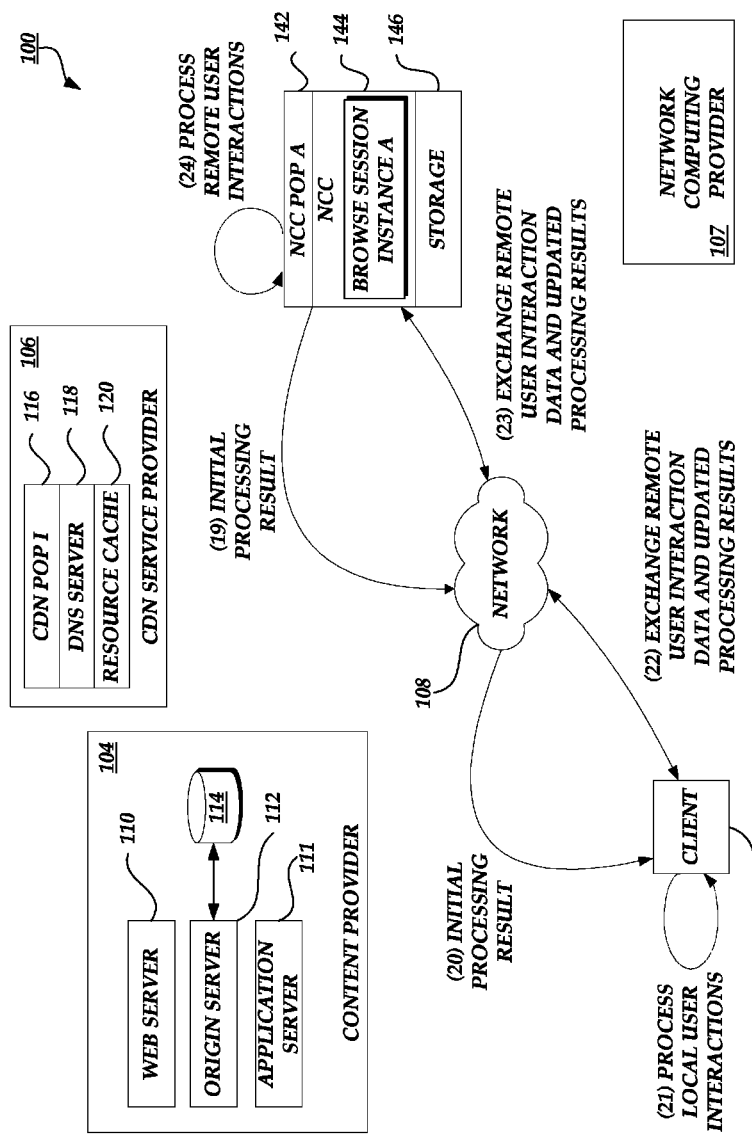
FIG. 5 is a block diagram of the content delivery environment of FIG. 1A illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a web page, along with associated embedded resources processed by the NCC POP 142 in accordance with a selected remote session browsing configuration as described in FIG. 4 above.

The NCC POP 142 also makes a determination of which additional processes will be conducted at the NCC POP 142, at the client computing device 102, or both, as illustrated in FIG. 5. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device 102 in response to changes to the content or remote user interaction data from the client computing device 102.

Figure 6:
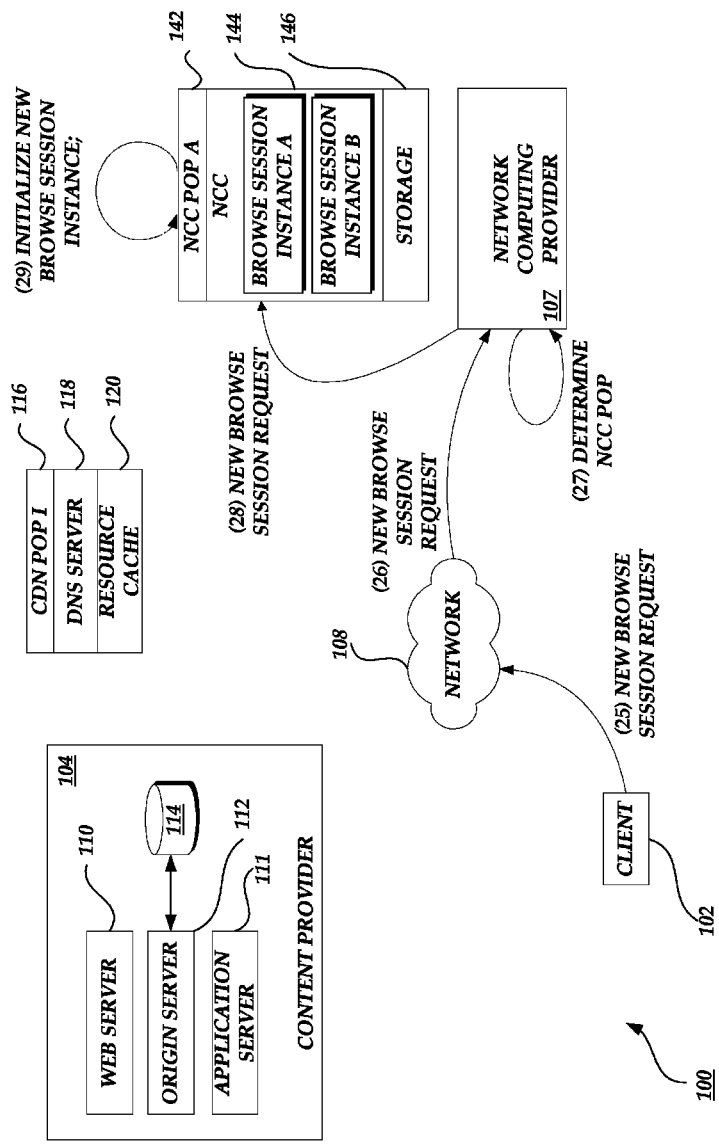
FIG. 6 is a block diagram of the content delivery environment of FIG. 1A illustrating the generation and processing of an additional new browse session request from a client computing device to a network computing provider.

With reference to FIG. 6, a block diagram of the content delivery environment of FIG. 1A illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first web page corresponding to a first browse session instance may follow a link that opens a new tab or browser window to view a second web page. In one embodiment, any required steps of obtaining and processing content associated with the second web page may be performed by the currently instantiated network computing component in which the browser can handle the processing of both resource requests. In another embodiment, the client computing device 102 request may be processed as a new browse session request to the network computing provider 107, including the network address of the second web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including web pages or other documents, text, images, video, audio, executable scripts or code, or any other type of digital resource.

As illustrated in FIG. 6, subsequent to the receipt of the browse session request the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

FIG. 7A is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 7B:
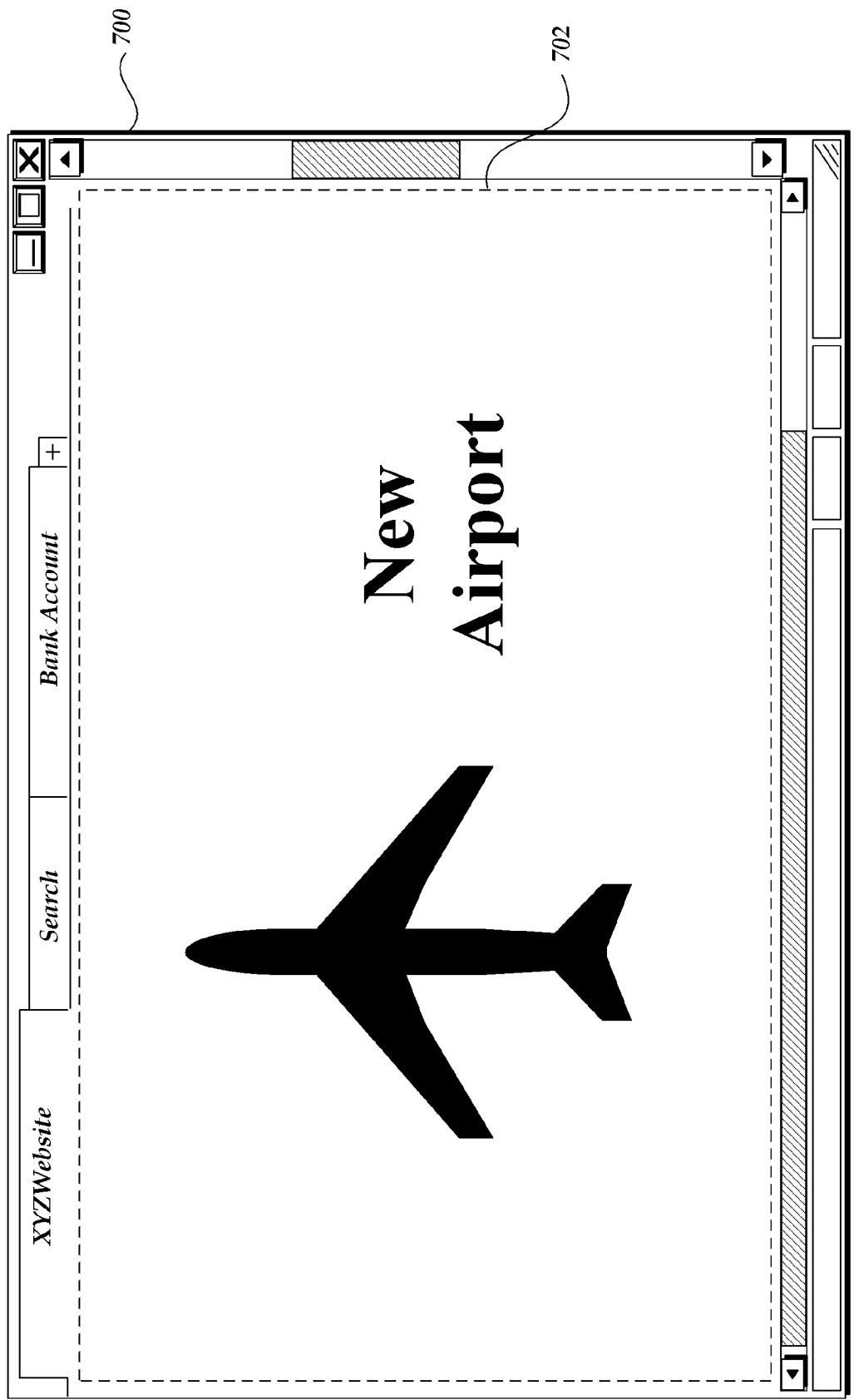
FIG. 7B is a user interface diagram depicting an the browser interface of FIG. 7A after a user has performed a zooming interaction.

A user may interact with the web page displayed in the content display pane 702, for example by using a keyboard, mouse, or performing touch screen gestures to the display of the client computing device 102. When a user wishes to view a content item or other portion of the web page more closely, the user may perform a touch screen zoom gesture 710, such as a "pinch to zoom" gesture. FIG. 7A illustrates a user performing a touch screen zoom gesture 710 on a content item 708. In response, the browser display pane 702 may change to display content item 708 in a larger size, as illustrated in FIG. 7B. As described herein, data regarding the zooming action may then be transmitted to the network computing provider 107 for use in calculating the popularity of the content item 708, identifying the most popular item(s) on the page, determining pages related to the content item 708, etc.

With reference to FIG. 7A, the web page may have multiple content items 706, 708. Some content items may not be popular or may have a low popularity. Other content items may be very popular and therefore may be associated with a large number of zooming interactions. For example, content item 708 is a top stories slideshow on a news web site, and therefore may be one of or the most popular content item on the web page, while content item 706, which is an advertisement, may be unpopular. A zoom button may be provided on a toolbar to facilitate zooming-in on the most popular portion of the web page displayed in the content pane 702, or to cycle through multiple popular content portions. As described below, the proxy server 182, when processing a request for a web page, may determine the most popular content item of the web page and transmit data indicating the popular content item to the client computing device 102. A user may activate the zoom button and the browser can access the data indicating the most popular content item and automatically zoom the display in on the most popular content item, such as content item 708. In some embodiments, such automatic zooming procedures may be ignored or weighted less in popularity determinations to prevent a scenario in which, once an item is presented to users as being the most popular, it remains the most popular going forward based primarily on the number of users using the automatic zoom feature.

FIG. 7B illustrates the browser of FIG. 7A zoomed in on a content item 708, as may occur when a user activates the zoom button. In some embodiments, the browser may focus the display of the web page on the content item 708 using techniques (not shown) other than, or in addition to, zooming the display. For example, the browser can center the display such that content item 708 is in the center of the display. The browser can outline, highlight, or otherwise alter the appearance of content item 708 to bring the user's attention to the content item 708. Zooming methods can be provided for use in combination with non-zooming methods of focusing the display. For example, the browser may highlight a content item, and then a user can initiate an automatic zooming procedure on the highlighted content item by tapping on the item, rather than standard methods of zooming such as pinching.

In some embodiments, a hovering link can be displayed in the content display pane 702, and activation of the link can automatically zoom the display on the most popular portion. For example, the hovering link 716 illustrated in FIG. 7C can be displayed instead of, or in addition to, the zoom button described above with respect to FIG. 7A. In some embodiments, a keyboard command, menu selection, voice command, or some other input can be used to automatically zoom the display on the most popular portion. For example, a touch screen gesture can be provided to facilitate automatically zooming on the most popular item, such as tapping on the top left corner of the screen. In some embodiments, the display can be zoomed-in on the most popular portion by default, without requiring any user interaction. In such cases, a button, link, keyboard command, menu selection, voice command, or some other input can be used to zoom out to view the entire page. The browser may be able to be configurable by users, including settings for whether and how to highlight the most popular item or items, whether to automatically zoom in on the most popular portion by default, whether to display related links, etc.

Figure 7C:
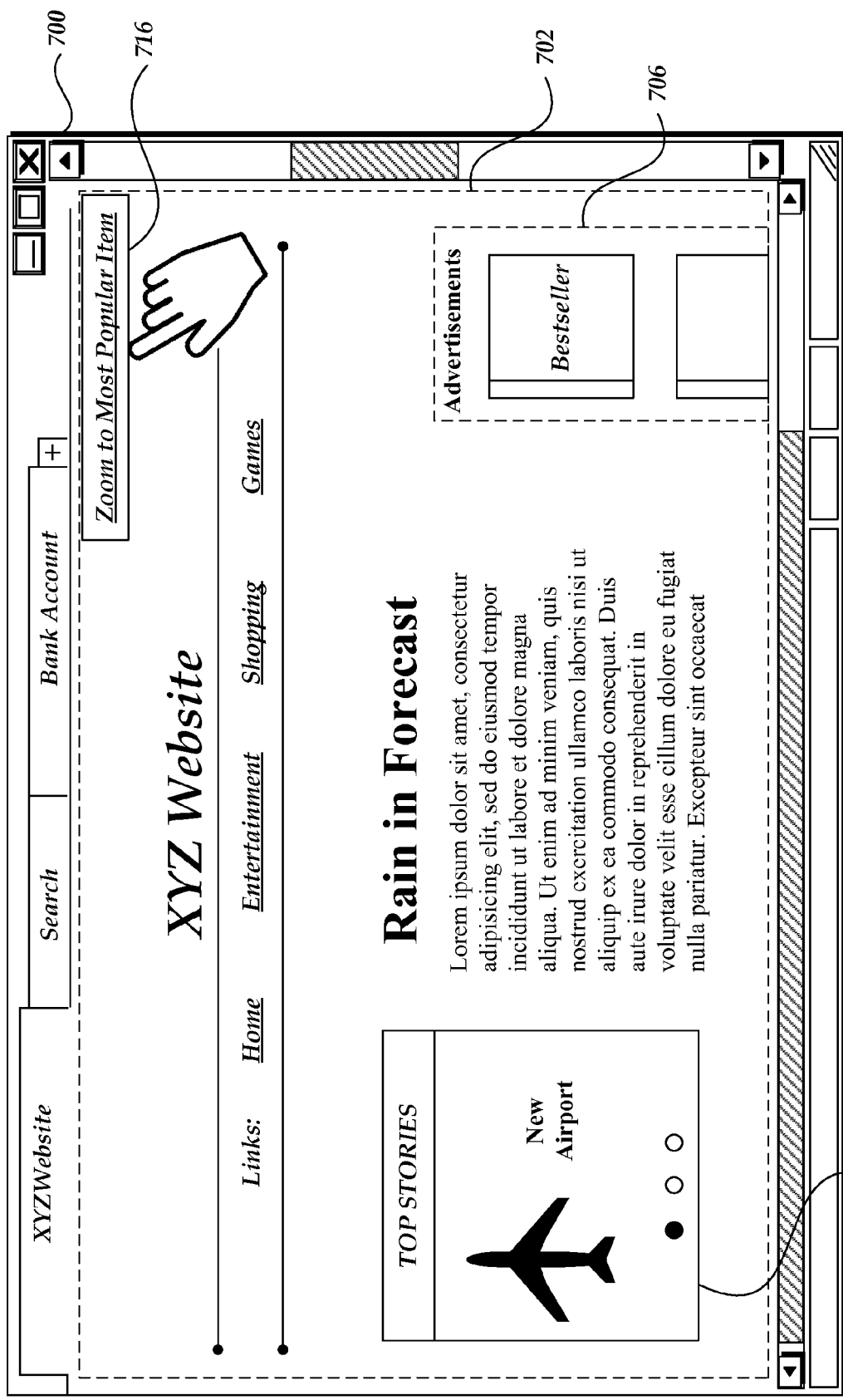
FIG. 7C is a user interface diagram depicting an illustrative browser interface with a zooming input control.
Figure 7D:
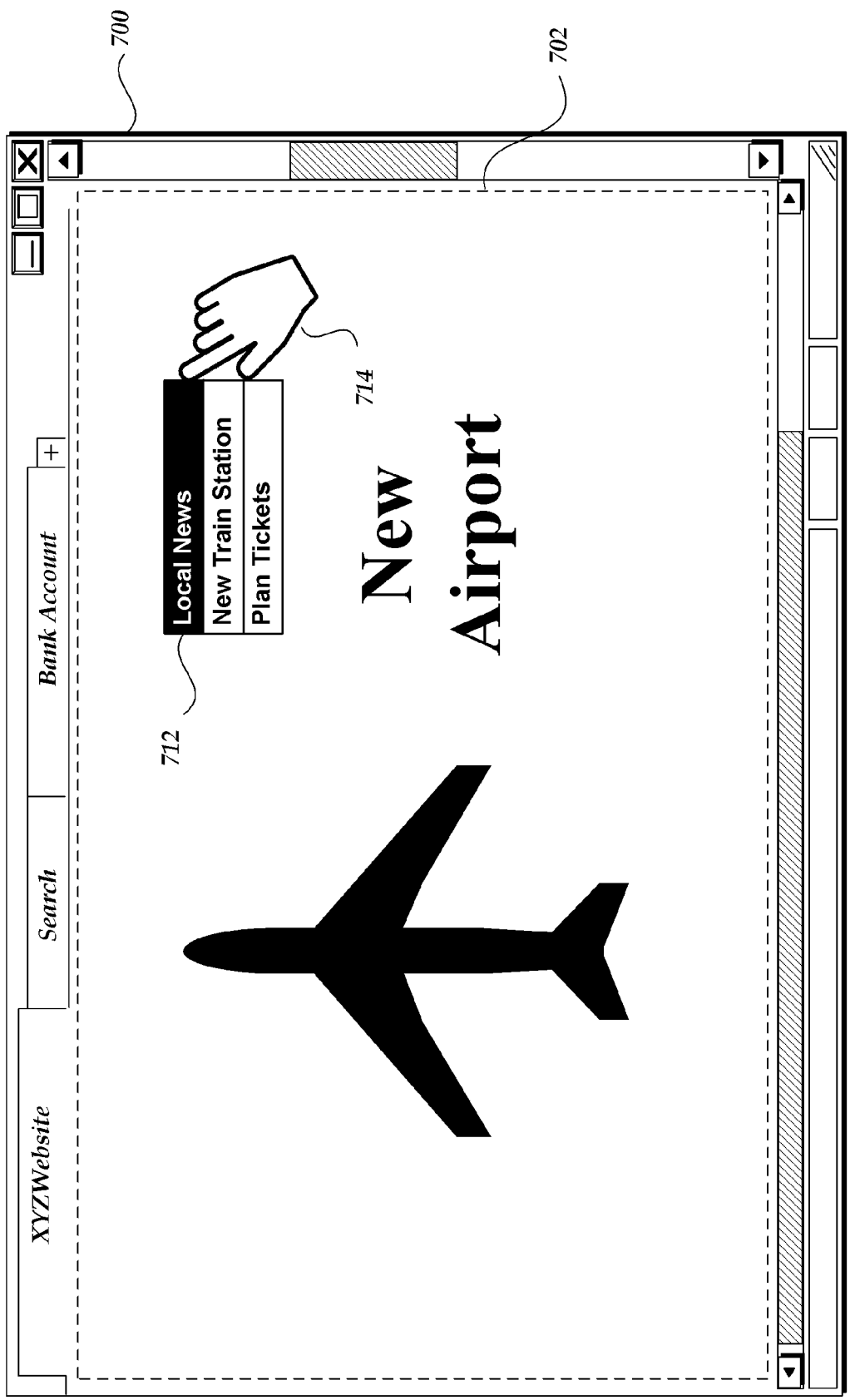
FIG. 7D is a user interface diagram depicting the browser interface of FIG. 7B after a list of popular related links has been displayed.

FIG. 7D illustrates the zoomed display of FIG. 7B also displaying related links 712. As described herein, the network computing provider 107 can determine relationships between pages based on zooming interactions, demographic data, navigation data, etc. In response to receiving a request for a web page, the proxy server 182 can respond with the requested page and additionally with one or more recommendations or links to related pages. In response to a user zooming in on a content item, the related links 712 can be displayed for a user to select from. In some embodiments, the related links may not be displayed until a user further interacts with the display, such as by performing a tap-and-hold gesture 714 or some other input. In some embodiments, the recommendations or links to related pages can be transmitted to the client computing device 102 in response to a user zooming in on a content item, rather than with the web page.

Figure 7E:
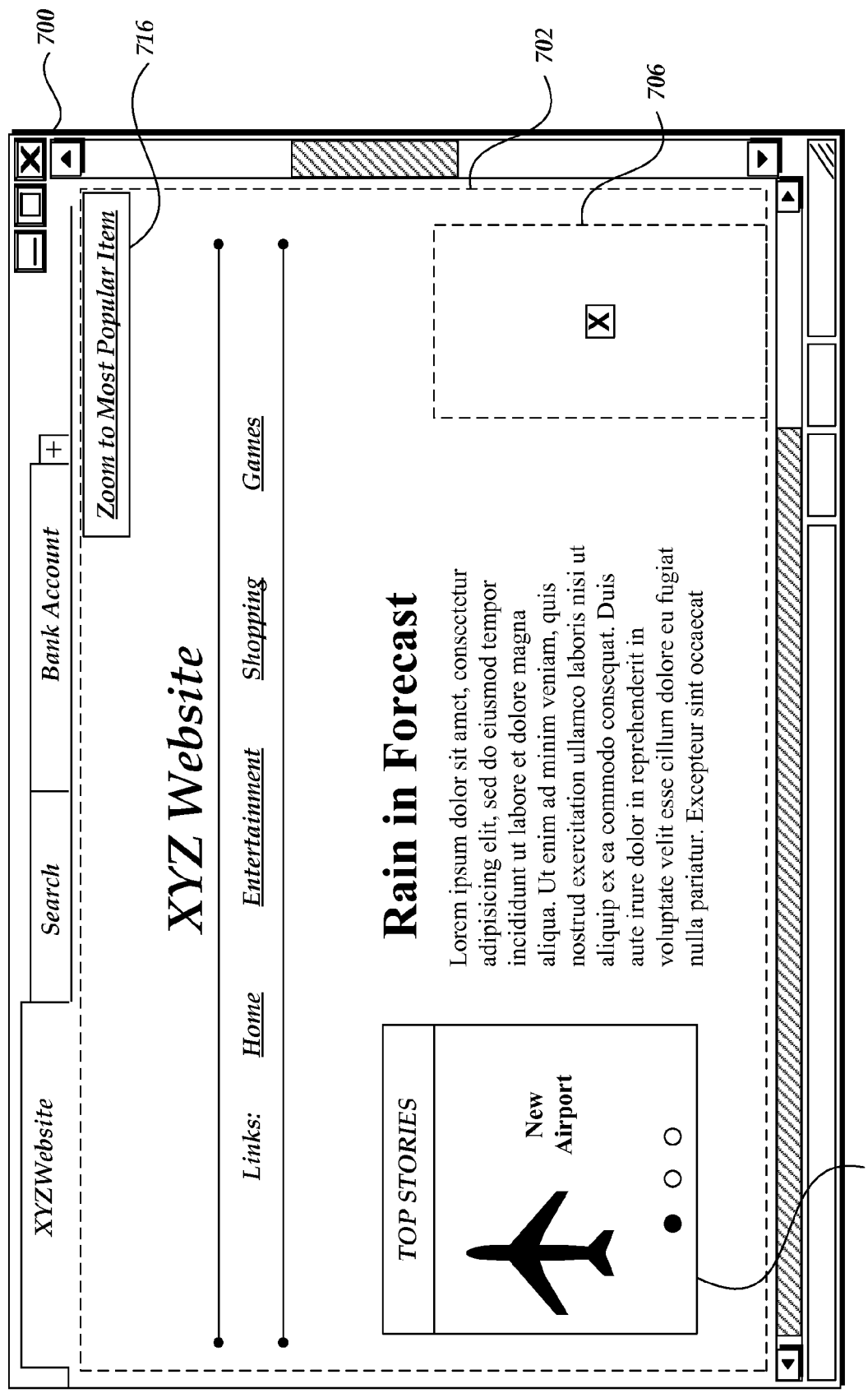
FIG. 7E is a user interface diagram depicting an illustrative browser interface with a portion of the content page omitted or not yet received and rendered.

FIG. 7E illustrates the browser interface 700 of FIGS. 7A and 7C, with content item 706 omitted. In some embodiments, the proxy server 182 can be configured to alter processing of responses to requests for web pages based on the popularity of content items or portions of the web page. If one content item, such as content item 706, has a popularity ranking or score that is below a threshold or is considerably less than other content items on the page, such as content item 708, then the proxy server 182 can retrieve and process the more popular content items first and transmit them to the client computing device 102 for display. The proxy server 182 can then retrieve and process less popular content items, in some cases processing and transmitting them after the more popular ones have already been rendered on the client computing device 102. As shown in FIG. 7E, this may result in a void where the less popular content item 706 is supposed to be displayed. When the proxy server 182 has finished processing the more popular content items, the less popular content item 706 can be processed and transmitted to the client computing device 102 for display. In some embodiments, content items or portions with a popularity below a threshold or with a low relative popularly ranking may be omitted from display altogether. In some embodiments, users can explicitly designate or otherwise indicate which content items or portions they dislike or otherwise object to, and those content items can be flagged for omission in response to subsequent requests by the user. In some embodiments, items disliked or objected to by a first user or client computing device 102 can be flagged for omission in response to requests from a second user or client computing device 102, all other users and client computing devices 102, etc. Omitted items can be displayed in response to clicking a toolbar button, inputting a touch screen gesture or mouse command, etc. In some embodiments, the proxy server 182, aggregated analysis component 184, or some other component of the network computing provider 107 can aggregate the explicit designations of a statistically significant number of users over time to identify a content item or items that users generally dislike or otherwise object to. Once a threshold is reached, the content item can be omitted in some or all of the subsequent response to requests for the page. The item may still be provided in response to a portion of requests in order to allow continued assessment of its desirability. A process for selectively omitting relatively unpopular content items may be implemented in similar fashion.

Figure 8:
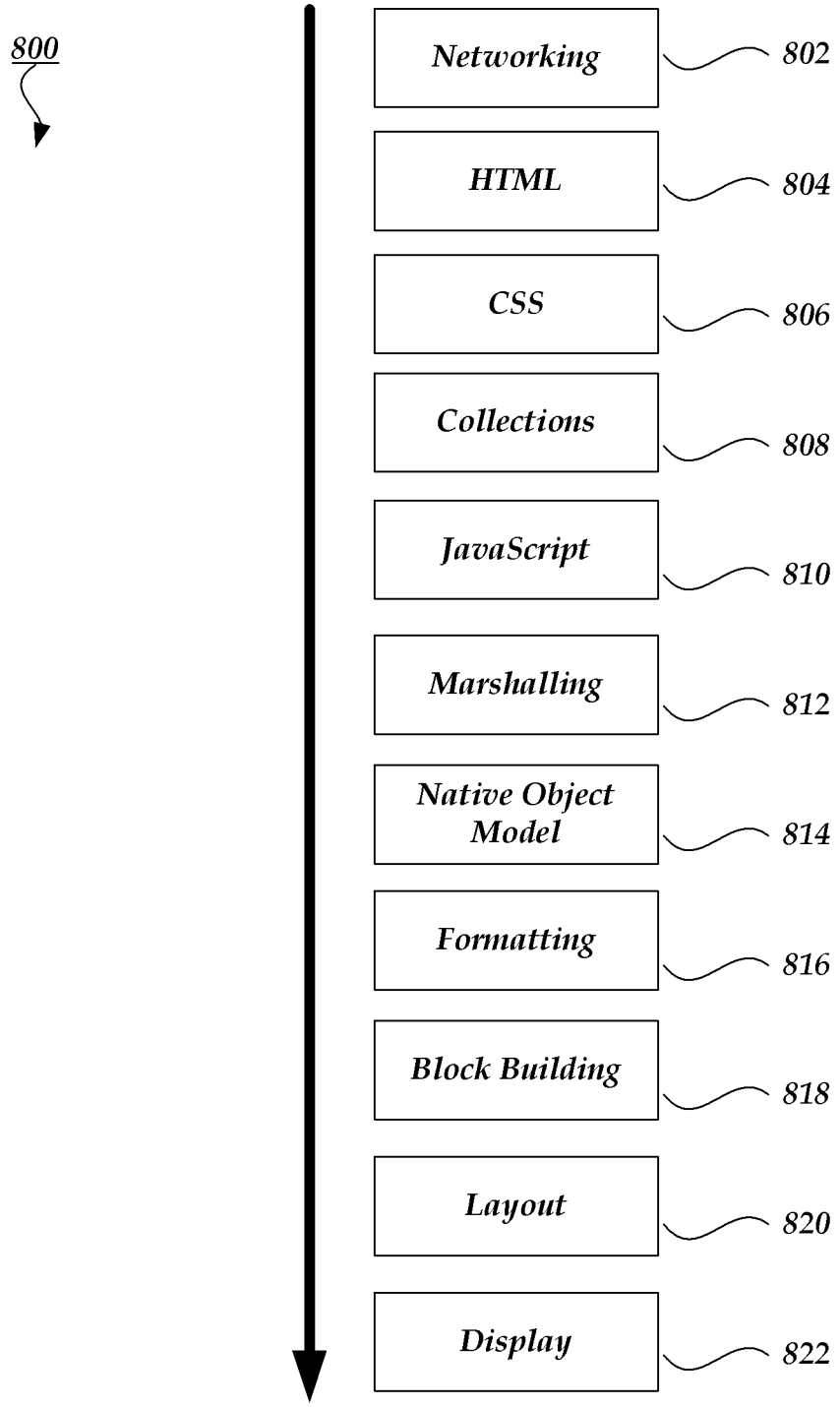
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of web pages or other web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
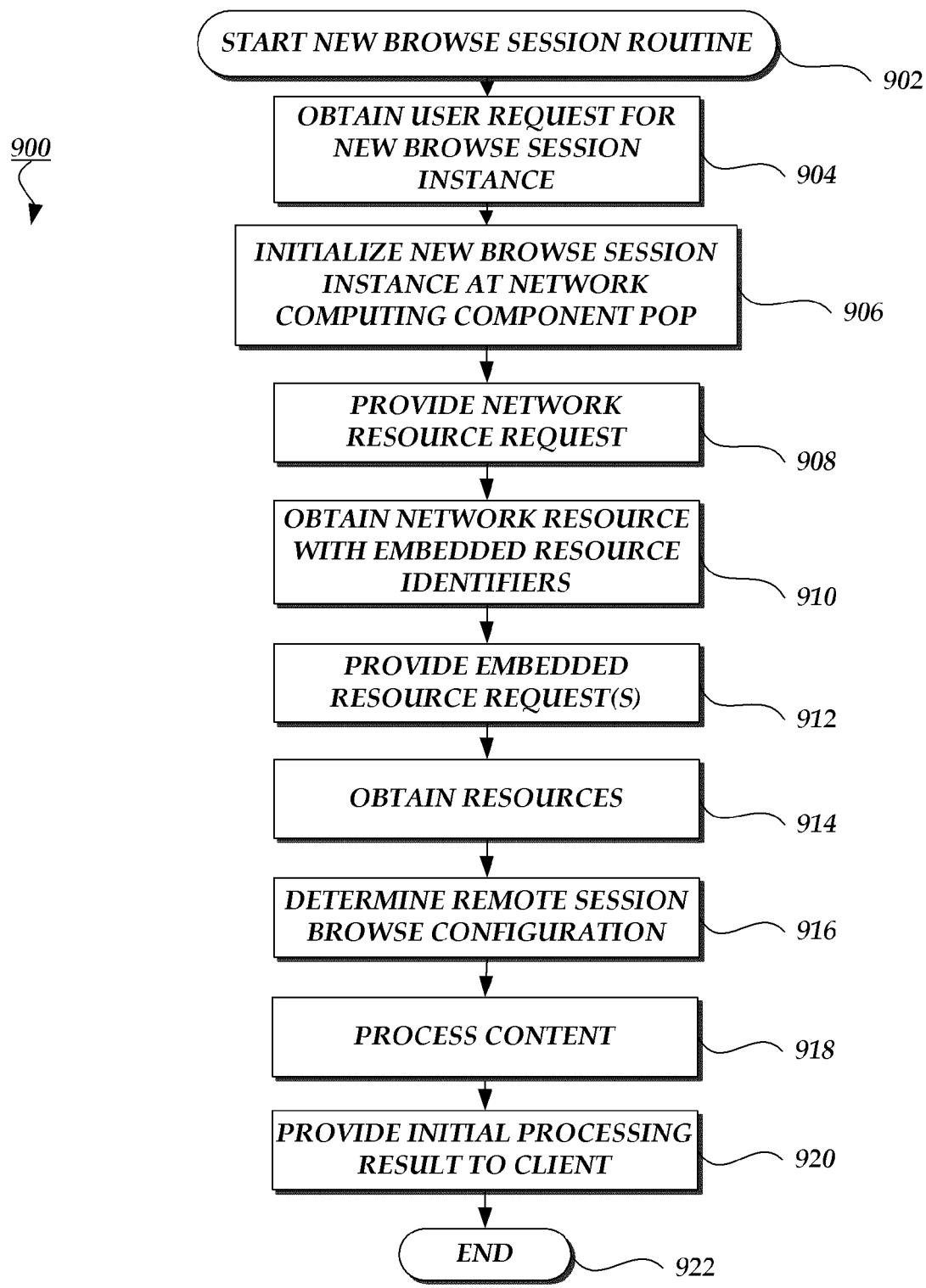
FIG. 9 is a flow diagram illustrative of a new browse session routine implemented by network computing provider.

FIG. 9 is a flow diagram illustrative of a new browse session routine 900 implemented by network computing provider 107 of FIG. 1A. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1A, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., web pages, video, Flash documents) may require various processing actions before being displayed on a computing device. A web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular web site, network domain, or set of related resources. A content provider that historically has provided video-heavy web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a web page. The NCC POP 142 may thus process the web page together with all embedded content based on the selected remote browsing session protocol, and utilize the remote browsing session protocol to exchange user interaction data and updated browse session data for all embedded content associated with the web page. In another embodiment, the NCC POP 142 may select different remote session browsing configurations for one or more resources in a set of network content. For example, a network resource such as a web page may reference processing intensive embedded Javascript or CSS resources, as well as embedded video resources. The NCC POP 142 may select a first remote session browsing configuration for the web page and all embedded resources excluding the embedded video resource, and a second remote session browsing configuration for the embedded video resource. Illustratively, this may result in the NCC POP 142 utilizing RDP to send a processing result to the client computing device 102 for display of the web page and associated embedded resources, while utilizing HTTP to send the embedded video as a separate, unprocessed file. In one embodiment, the client computing device 102 may perform the minimal processing required to display the RDP processing result corresponding to the web page and embedded resources, and may also perform additional processing necessary to display the embedded video, for example, overlaying the video on top of the displayed RDP representation of the web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142.

In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a web page corresponding to a processing result from the NCC POP 142 (e.g., RDP display information representing the rendered page) until the browser is finished processing and rendering the web page locally. The browser may then replace the representation from the NCC POP 142 with the locally rendered representation of the web page. Illustratively, replacing one representation with another representation may be transparent to the user. For example, the local and NCC POP 142 representations of the web page may be identical or substantially identical. In one embodiment, when the NCC POP 142 representation of the web page is displayed, the browser may send various user interactions with the displayed page to the NCC POP 142 for processing. When the locally rendered version of the web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
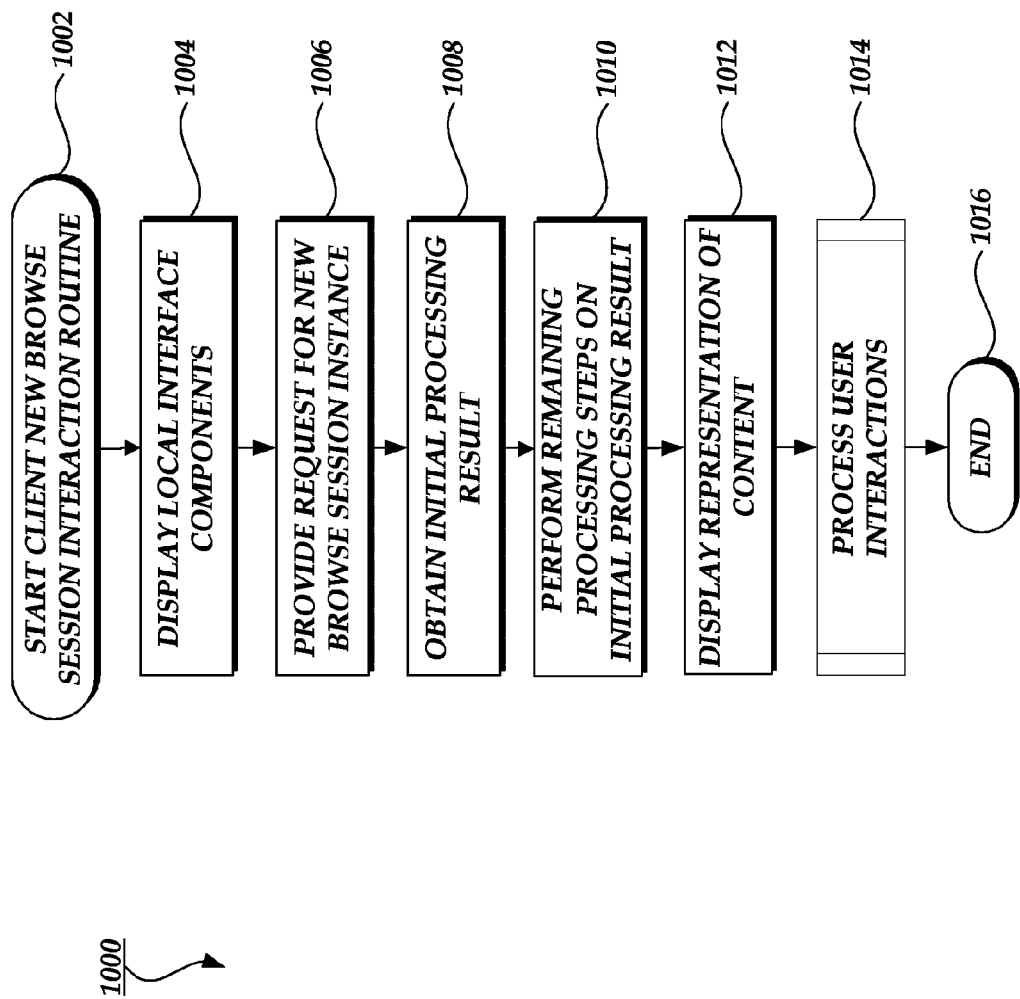
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7A above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a web page and associated content for display via RDP in a browser instance running in a virtual machine instance at the NCC POP 142. The browser instance may have one or more interface elements such as toolbars, menus, scroll bars, etc., in addition to the displayed web page. The NCC POP 142 may send an RDP processing result corresponding to the displayed web page only, without any of the interface elements associated with the browser. Illustratively, including an RDP processing result corresponding to the displayed web page only may allow the browser at the client computing instance 102 to display the web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
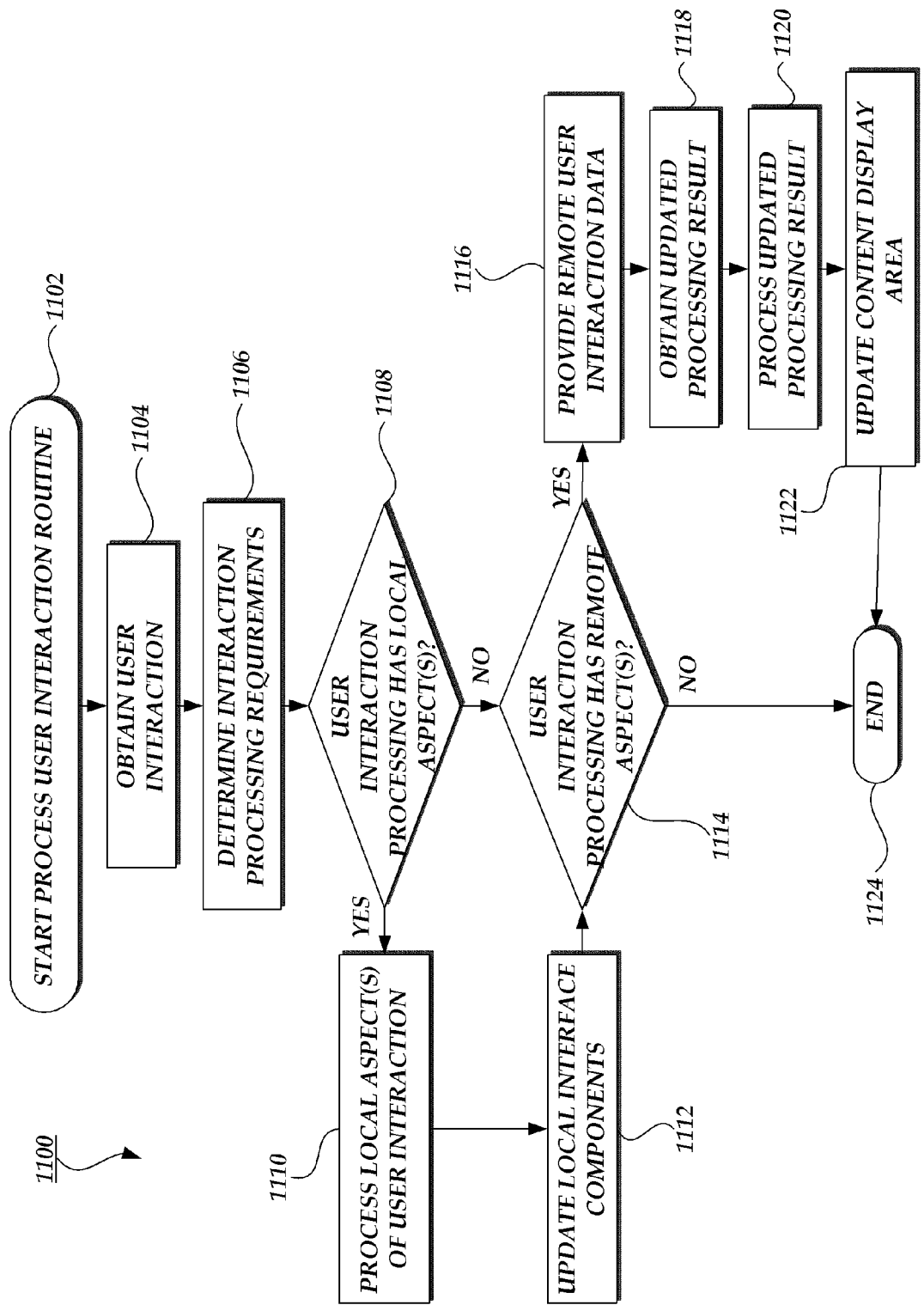
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a web page may require processing and may change the configuration or visual appearance of the web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7A. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7A and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7A and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
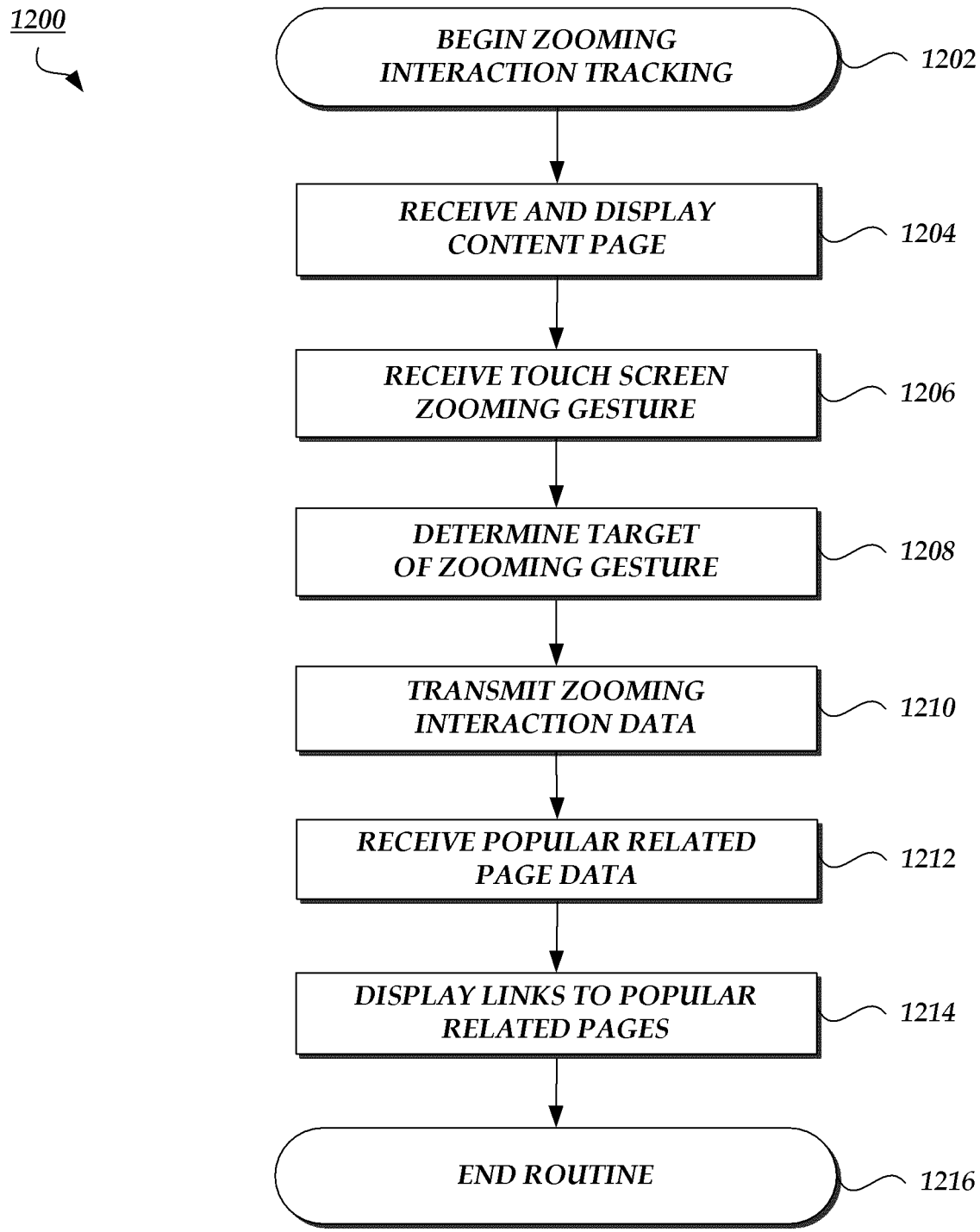
FIG. 12 is a flow diagram illustrative of a routine implemented by a client computing device for tracking zooming interactions and transmitting interaction data to a network computing provider.

FIG. 12 illustrates a routine 1200 implemented by a browser 190 with zoom tracking for tracking zooming interactions of users and transmitting data about the zooming interactions to a proxy server 182 or other component of a network computing provider 107. As described in detail above, the browser 190 can execute on a client computing device 102. In some embodiments, the client computing device 102 can be configured with a touch screen input. When a user wishes to view a portion of a network resource, such as a web page, web page, image, video file, applet, animation, document, or other content object of a web site, more closely, the user can perform a touch screen zooming gesture to zoom the display on the desired portion. For example, the user may zoom the display in order to read text or view details of an image. Information about the portions that users choose to zoom the display on can be aggregated and used to determine which portion of the web page is the most popular generally and/or among a defined group of users (e.g., the target user's social network, or all users who arrive at the page from a particular site of class of sites).

While the routine 1200 is described below with respect to the browser's 190 tracking of touch screen zooming interactions and transmission of data to a network computing provider 107, the description is illustrative only and is not intended to be limiting. For example, a client computing device 102 configured with a user-facing camera may be configured with a browser 190 or other component that tracks eye movements of a user, and uses the eye movements to determine which portions of the display are of interest to the user. The eye movement data can be transmitted to the network computing provider 107 in a manner similar to zooming interactions. In another example, a user may use keyboard commands, mouse movements and clicks, or voice commands to interact with a client computing device 102 to focus the display of the browser 190 on content of interest. In yet another example, a user may explicitly designate, through the input methods described above or some other input method, which portion or portions of a web page the user finds to be the most interesting or important.

In a further example, a user may select portions of a web page to archive for access in the future, and data regarding such selections may be transmitted to a network computing provider 107. For example, some services, such as Evernote, enable each user to select a portion of a web page (or other document) and have that portion added to personal archive for later viewing. These content selection and archiving behaviors can be monitored across many users as an additional or alternative basis for assessing popularity levels of particular portions of web pages. In some embodiments, a browser 190 or other component may also track when users save files, such as web pages, images, documents, and the like, to a local hard drive or a network file share. The browser 190 or another component may also track when users copy and/or paste URLs, such as when a user pastes a URL in to an email or posts a link to a web page on a social networking site. Such interactions may indicate an item of particular interest to a user, and may be weighted more when the aggregated analysis component 184 determines popularity levels, as described below with respect to FIG. 13.

The zooming interaction tracking routine 1200 illustrated in FIG. 12 can begin at block 1202. The routine 1200 can begin upon browser 190 initialization, upon receipt of a requested web page, upon request by a user, etc. In response to the initialization of the routine 1200, execution can proceed to block 1204.

At block 1204, the browser 190 can receive a requested web page or other network content object for display. The browser 190 can perform any processing that is to be performed at the client computing device 102 according to the browsing configuration determined by the proxy server 182 or some other component of the network computing provider 107, as described in detail above. In response to displaying the web page to the user, the routine 1200 can proceed to block 1206.

At block 1206, the browser 190 can monitor receive user interactions with the displayed content, such as touch screen zooming gestures. Client computing devices 102 configured with touch screen displays can have operating system components which receive touch screen input and determine which portion of the display has been touched, or in a multi-touch display which portions have been touched. The operating system component can also receive input about touch movements across the display. The operating system component can pass information about the touch and movement combination to the application that is currently displaying in the portion of display that was touched. For example, if a browser 190 is executing on such a client computing device 102, a user may touch the display with two fingers, and then spread the fingers apart from each other. Information about the touch and movement combination can be sent to the browser 190, including display coordinates of the initial touch, direction and velocity of each movement, display coordinates of the end of the movement, etc. The browser 190 may determine that the touch and movement combination is a zooming gesture. The browser 190 can then enlarge the area of the display that was under the portions initially touched by the user. In some embodiments, other touch inputs may be used. For example, a user may double tap or touch and hold an area of the display, and the browser 190 can zoom in on the area touched, display a context-sensitive menu of options, etc. In response to the browser 190 receiving such user input, the routine 1200 can proceed to block 1208.

At block 1208, the browser 190 can determine the target of the zooming gesture. The browser 190 or some component of the operating system may handle the zooming of the display in response to the user input received in block 1206. In addition, the browser 190 can be configured to determine the contents of the portion of the web page on which the user zoomed the display. For example, the browser 190 can inspect the layout structure of the page and the portion zoomed, such as by analyzing any HTML tags or content item identifiers associated with the portion. In another example, the browser 190 may record a screenshot of the zoomed in area. In response to determining which content item or other portion of the web page has been zoomed, the routine 1200 can proceed to block 1210. In some embodiments, the browser 190 does not determine the content at the target of the zooming gesture, and the routine 1200 proceeds directly to block 1210 in response to the browser 190 receiving data about the touch screen zooming input.

At block 1210, the browser 190 can transmit zooming interaction data to a proxy server 182 or other component of a network computing provider 107. For example, the browser 190 can transmit the HTML tags associated with the portion, a screen shot of the zoomed portion of content, etc. In some embodiments, the browser 190 does not determine the content at the target of the zooming gesture, and the browser 190 instead transmits data about the touch screen input, received in block 1206, to the network computing provider 107. For example the browser 190 can transmit screen coordinates representing the portion of the web page in the zoomed display.

At block 1212, the browser 190 can receive data, from the proxy server 182 or another component of the network computing provider 107, indicating web pages or other network content related to content items of the currently displayed web page. For example, the browser 190 may receive a network address, such as a URL, of the most popular page related to each of continent items of the currently displayed web page. In another example, the browser 190 may receive multiple URLs of popular web pages related to the most popular content item of the currently displayed web page or to the content item on which the display is currently zoomed. The data regarding related pages may be received when the web page is initially received, or at some time thereafter.

At block 1214, the browser 190 can display one or more links to recommended or popular pages that are related to a content item of the currently displayed web page, as illustrated in FIG. 7D. For example, if a user has zoomed the display on a content item, a list of links can be immediately displayed next to the content item or in some other visible portion of the display. In some embodiments, further user interaction may be required to display the list of related links, such as a touch and hold user input. At block 1216 the routine 1200 ends.

In some embodiments, the blocks of the routine 1200 may be performed in a different order, or some blocks may be omitted. For example, blocks 1212 and 1214 may be omitted when the browser 190 is configured only to monitor user zooming interactions and transmit interaction data to a network computing provider 107, or when a user configures a browser setting to prevent display of links to related content.

In some embodiments, the browser 190 (or a special browser toolbar or add-on) may retrieve the requested web page from its native source, and may retrieve the information regarding the most popular portion(s) of the page from a distinct "metadata server" associated with the browser 190 or browser toolbar. In such embodiments, the proxy server 182 may be omitted. The metadata server may be operated by an entity that aggregates and analyzes interaction data for many different sites. One example of a metadata server that stores and serves metadata for particular pages is described in U.S. Pat. No. 7,159,023, the disclosure of which is hereby incorporated by reference.

In some embodiments, the information collected by the browser 190 or another component can be provided to content providers 104 or other entities. For example, access to the data can be sold or otherwise provided to content providers 104, either in summary format (e.g.: popularity levels, as calculated by the aggregated analysis component 184 and described below with respect to FIG. 13) or in a more detailed format (e.g.: the interaction records from client computing devices 102, such as data about zooming or saving interactions). Content providers 104 may use such information to improve the relevance of unpopular portions of a web page, to provide more relevant advertisements, to tailor content items to the interests of specific users, and the like. In some embodiments, the content providers 104 may be provided with an API or other method to request alternative processing by the proxy server 182, such as reducing resolution of popular items during period of peak activity, etc.

Figure 13:
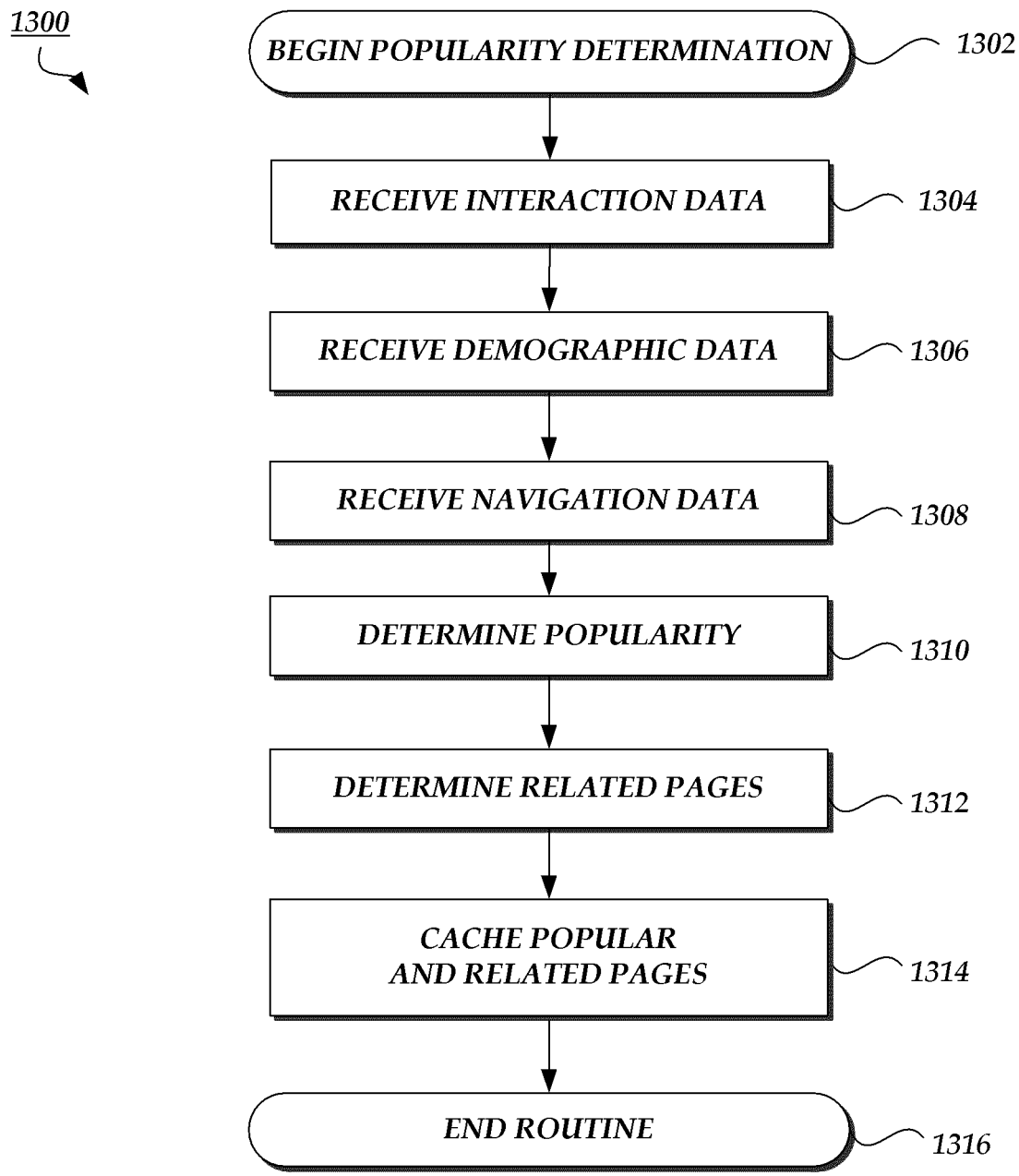
FIG. 13 is a flow diagram illustrative of a routine implemented by a network computing provider for processing zooming interaction data and determining popularity.

FIG. 13 illustrates a routine 1300 implemented by an aggregated analysis component 184, a proxy server 182, or some other component of a network computing provider 107, for determining a popularity ranking or value for content items. As described in detail above, the aggregated analysis component 184 may be provided with access to zooming interaction data (and/or other types of behavioral data, as described above) received from multiple client computing devices 102. The aggregated analysis component 184 can use this data to determine which content items or portions of a page are more popular than others, and can assign a relative popularity ranking or an independent popularity value to one or more of the content items. (As mentioned above, this analysis may, in some embodiments, be repeated for multiple distinct groups of users who access the particular page.) In addition, the aggregated analysis component 184 can be provided with access to demographic information, navigation information, and other data, and can use such data when calculating and assigning popularity rankings and values. The aggregated analysis component 184 can also use the demographic, navigation, and other data to determine related web pages and content items, which can then be recommended to users. The popularity and related web page determinations can be used when determining which resources to cache, for how long to cache them, whether to update the cache, etc.

The routine 1300 begins at block 1302. The routine 1300 can be initialized when the aggregated analysis component 184 begins execution. In some embodiments, portions of the routine 1300 can be initialized and executed each time the aggregated analysis component 184 receives zooming interaction data from a client computing device 102. In some embodiments, the routine 1300 can be initialized on a schedule or on demand by a system administrator. In response to the routine 1300 being initialized, execution can proceed to block 1304.

At block 1304 the aggregated analysis component 184 can receive zooming interaction data from one or more client computing devices 102. The zooming interaction data can be received directly from the client computing devices 102 or may be retrieved from a storage component 186. As described above, the zooming interaction data may contain display coordinates of content items, screenshots or other representations of content items, etc.

At block 1306 the aggregated analysis component 184 can receive demographic data for one or more users or client computing devices 102. The demographic data can include user characteristics, such as age, occupation, interests, etc. The demographic data may be retrieved from a storage component 186 or may be received directly from client computing devices 102 when requesting network resources or when transmitting zooming interaction data. In some embodiments, demographic data may be received once, during set up of a user account. A user may choose or be given a user name or other unique identifier, and the identifier may be transmitted to the aggregated analysis component 184 or other component of the network computing provider 107 whenever user or client computing device 102 data is transmitted, including requests for content resources, zooming interaction data, navigation data, etc. The aggregated analysis component 184 can use the identifier to access other data related to the same user or client computing device 102. In some embodiments, demographic data is not collected from users, or is not used by the aggregated analysis component 184 in calculating popularity and determining related content.

At block 1308 the aggregated analysis component 184 can receive navigation data for one or more client computing devices 102. As with demographic data, the navigation data can be retrieved from a storage component 18 or may be received directly from client computing devices 102. The navigation data can include URLs or other identifiers of content that users or client computing devices 102 navigated to either before or after a web page on which the user zoomed the display. In some embodiments the navigation data can include identifiers of content that users or client computing devices 102 navigated to during other times, such as historical web page requests, etc.

At block 1310 the aggregated analysis component 184 can determine the popularity of content items and portions of web pages. As described above, the aggregated analysis component 184 can calculate the percentage of time users zoom on each content item or portion of a web page, as determined by the zooming interaction data received form the client computing devices 102. In some embodiments, the aggregated analysis component can determine a popularity value rather than, or in addition to, a relative ranking. For example, the aggregated analysis component can consider the length of time the display was zoomed on a content item, and can assign a low popularity value to a content item on which displays of client computing devices 102 are often zoomed because users immediately scroll away, zoom out, or otherwise change the focus of the display away from the content item. Additionally, the aggregated analysis component 184 can determine popularity rankings or values of content items for users in different demographic categories or different user groups. Therefore each content item may have more than one popularity ranking or weight. In some embodiments, the aggregated analysis component 184 may place more emphasis on recent zooming interaction data, demographic data, and navigation data when determining the popularity of content items, and less emphasis on older data. In some embodiments, the aggregated analysis component 184 may only use zooming interaction data, demographic data, and navigation data that has been received within a predetermined or dynamically calculated period of time.

Many web pages change on a regular basis or are dynamically generated each time they are requested. In such cases, the aggregated analysis component 184 may determine whether a content item has changed in the time since user zooming interaction data was received for the content item. If the content item has changed, the aggregated analysis component 184 can exclude or give less weight to the user zooming interaction data when determining the popularity of the content item. In some cases, even if the specific content has changed, the subject matter may remain the same. For example, content area 708 of FIG. 7A can display the top stories of the news day, content which changes daily or even minute-to-minute. However, the "top stories" content item 708 itself may be the popular portion of the web page, and therefore user zooming interactions with the content item 708 from a previous time may still be relevant.

At block 1312 the aggregated analysis component 184 can determine relationships between popular web pages and content items. The aggregated analysis component 184 can use navigation data to determine which pages and content items a user has viewed before or after a page on which the user zoomed the display. Illustratively, a user may have viewed a local news web site, and then navigated to www.xyzwebsite.com, illustrated in FIG. 7A. Subsequently, the user may have zoomed the display on a content item 708, as illustrated in FIG. 7B. Navigation data including the address or other information identifying the local news web site can be transmitted to the network computing provider 107 and stored in a storage component 186. The aggregated analysis component 184 can determine that the local news web site is related to ww.xyzwebsite.com and/or to the content item 708 if a statistically significant number of users have also navigated from the local news web site to www.xyzwebsite.com and then zoomed on content item 708. The relationships between web pages and content items can also be based on demographic data. Returning to the example, the aggregated analysis component 184 can determine that the relationship between the local news web site and content item 708 of www.xyzwebsite.com is stronger for users with certain demographic characteristics, such as those users over the age of 35 and in the geographical area that the local news site covers. Data about the relationships can be stored in a storage component 186, for example in a URL-to-item mappings 196 storage area. The relationship data can be used to create links to related popular web sites, as described in detail herein, for transmission to and display on client computing devices 102.

At block 1314 the aggregated analysis component 184, proxy server 182, or some other component of the network computing provider 107 can determine a caching policy to cache resources associated with popular and related web pages and content items. Resources can be cached in a cache 194 portion of a storage component 186, in some other component of the network computing provider 107, or at a third party component, such as a CDN service provider 104. In some embodiments, the proxy server 182 can be configured to cache resources associated with all content items having a popularity ranking or score that exceeds a threshold each time the proxy server 182 retrieves a new version of the content item in response to a request from a client computing device 102. In some embodiments, a component of the network computing provider 107 can be configured to regularly monitor resources associated with popular content items, caching them when it is determined that they have changed. In some embodiments, a component of the network computing provider 107 can be configured to update the cache on a regularly scheduled basis, or on demand in response to a command from a system administrator or the occurrence of some system event, etc. At block 1316 the routine 1300 ends.

Figure 14:
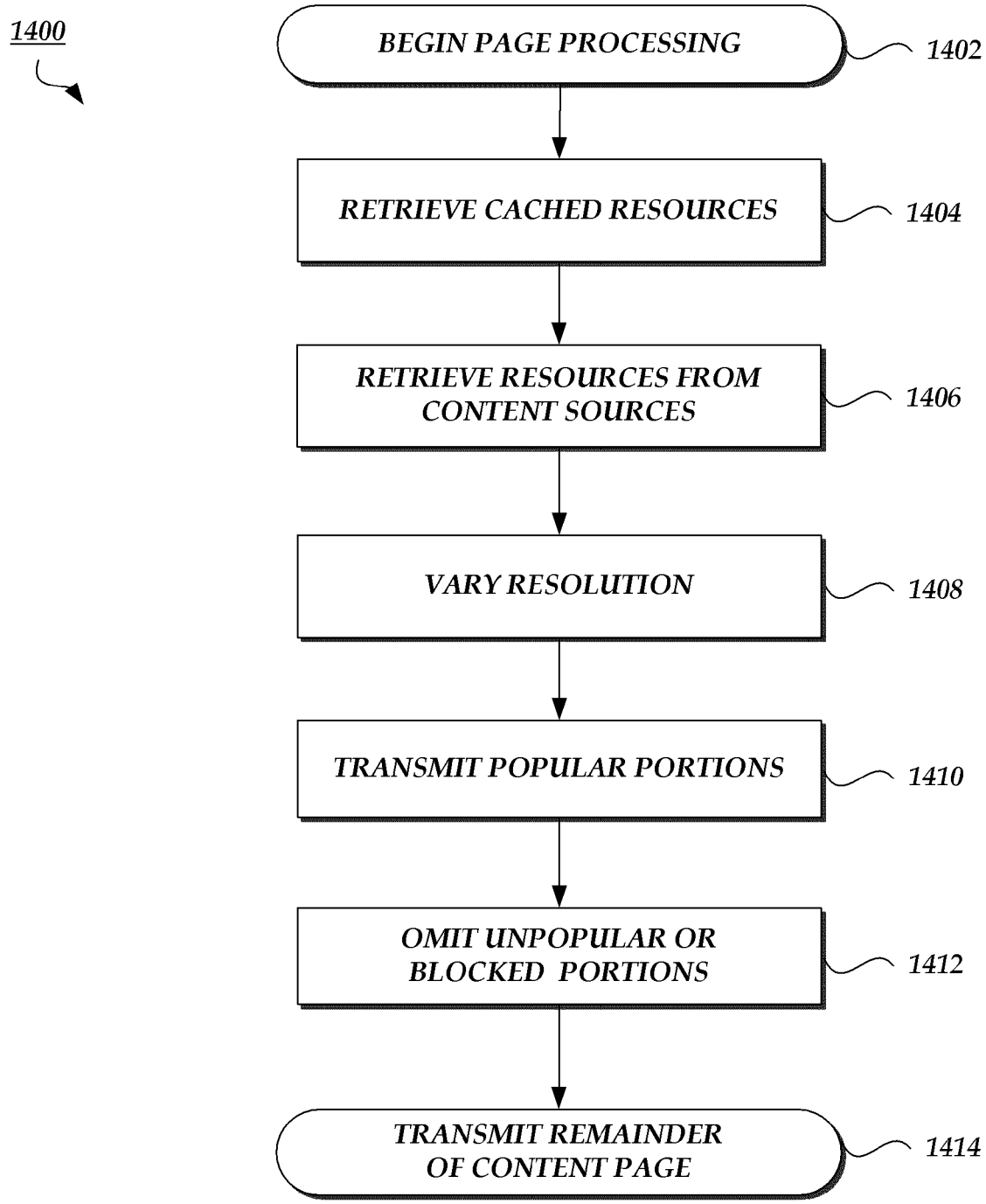
FIG. 14 is a flow diagram illustrative of a routine implemented by a network computing provider for processing and responding to requests for content pages.

FIG. 14 illustrates a routine 1400 for processing requested pages according to the popularity determinations described above. The routine 1400 can be implemented by a proxy server 182 or some other component of the network computing provider 107. The routine 1400 can begin at block 1402, in response to receiving a request for a web page from a client computing device 102. In response to receiving a request, the proxy server 182 can proceed to one or more of the subsequent blocks of the routine 1400, depending on the particular web page requested, the configuration of the proxy server 182, etc. For example, the routine 1400 may proceed directly to block 1408 when there are no resources in the cache to retrieve, as described in block 1404, and when the proxy server is not configured to dynamically adjust the resolution of content, as described in block 1406.

At block 1404, the proxy server 182 can retrieve cached resources that are responsive to the request from the client computing device 102. The resources may have been cached as part of an operation described above with respect to block 1314 of FIG. 13.

At block 1406, the proxy server 182 can retrieve any resources which have not been cached. Such resources can be retrieved from content sources such as content provider 106, CDN service providers 104, etc. as described in detail above.

At block 1408, the proxy server 182 can vary the resolution of one or more content objects of requested web page, such as photos, images or videos. In some embodiments, the proxy server 182 can base its determination of whether and by how much to vary the resolution based on popularity rankings or values associated with content sections of the web page. For example, if an image or video is associated with the highest popularity ranking on the web page, the proxy server 182 can transmit the highest resolution version of the image or video that it is able to retrieve, because there may be an increased likelihood that a user will zoom the display of the client computing device 102 on the image or video. If an object is associated with a high popularity ranking or level, the proxy server 182 can alternatively reduce the resolution of the item, or re-transcode it into a more efficient format, so that the item does not consume a large amount of bandwidth due to a potentially high request volume. Such compression may reduce bandwidth costs to content providers 104 and to users of client computing devices 102, and reduce the time it takes for a user to receive a popular item. In some cases, the proxy server 182 may be provided with or otherwise have access to information about the client computing device's 102 connection type and/or device type. If a mobile device with less computing power and a low bandwidth connection requests an item that may consume a large amount of bandwidth, the item can be compressed or re-transcoded. If a large image or video file embedded into the web page has low popularity ranking, the proxy server 182 can compress the file to improve transmission speed and reduce the memory footprint of the page. In some cases, the proxy server can transmit a static image associated with a video instead of the video file itself.

The resolutions of certain content objects may additionally or alternatively be selected based on a user-specific prediction of the likelihood that the user will zoom-in on such object. For instance, if the user accesses a news story page having a photo, and this user zooms in on photos of news story pages relatively frequently (as determined by monitoring the user's behaviors), the proxy server 182 may serve a full resolution version of the image regardless of the image's popularity. As another example, the proxy server 182 may serve a full resolution version of a content object based on a determination that a statistically significant number of the user's social network contacts have zoomed in on, or have otherwise exhibited an interest in, the content object. Other factors that the proxy server 182 may consider when determining whether to vary the resolution include the speed of the network connection with the client computing device 102 and the display size of the client computing device 102, if such information is available to the proxy server 182. In some embodiments, the user may be provided with configuration options to control the adjustment measures taken by the proxy server 182. For example, the user may elect to always receive reduced-resolution versions of popular content, to receive reduced-resolution versions of popular content during periods of peak demand, to omit unpopular content during periods of peak demand, etc.

At block 1410, the proxy server 182 can transmit popular portions of the web page to the client computing device 102 on an expedited basis. For example, if a content item of the web page is associated with a high popularity ranking or value, that item can be processed at the proxy server 182 in accordance with the chosen browsing configuration and transmitted to the client computing device 102 before some or all of the rest of the items associated with the web page. The proxy server 182 may augment the requested page with coding for enabling the browser 190 to execute an automatic zoom operation on a particular content object. This coding may, in some cases, cause the browser 109 to highlight the object on the page, so the user can tap on it to initiate the zoom operation, or so that the user knows what will be zoomed-in on if the user selects a zoom button. The coding may include a special tag that identifies the object, and/or may include data specifying the page coordinates of the area to zoom-in on.

At block 1412, the proxy server 182 can omit unpopular or blocked content items from the web page processing. For example, a user may have blocked an image or advertisement on a web page during a previous browsing session, and the same user is now requesting the same web page. The proxy server 182 can omit the image or advertisement from subsequent responses to the client computing device 102. In another example, several users may have blocked a video, advertisement, comment, image, or some other portion of a web page within a period of time. The proxy server can then omit the portion from all subsequent requests for the web page, or can include a warning its place which allows subsequent users to override the warning and receive the portion. In some embodiments, the proxy server 182 can replace unpopular or blocked content items with other content items that may be more popular or that may be of interest to the particular user requesting the web page. For example, and as described above, the network computing provider 107 can sell or otherwise provide content providers 104 with access to information about which portions of the content provider's 104 web pages are popular and which portions are unpopular, either relative to other portions of the same web page or with respect to portions of a group of web pages. The content provider 104 can then alter which content items it includes on a web page, or request that the proxy server 182 replace unpopular content items on a user-specific basis or for every user. Such content substitution can improve the overall relevance of the web page and increase interest in otherwise low-interest portions.

At block 1414, the proxy server 182 can transmit the remainder of the web page. The remainder of the web page may include less popular portions, portions requiring a large amount of processing by the proxy server 182 in accordance with the browsing configuration, etc. In response to transmitting the remainder of the web page to the client computing device 102, execution of the routine 1400 can terminate.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for assessing popularity levels of network content objects, the system comprising:
   a server comprising hardware configured to execute specific instructions, the server operable to:
      receive interaction data from a plurality of client computing devices, wherein the interaction data received from individual client computing devices of the plurality of client computing devices reflects a zooming interaction, processed exclusively at the client computing device, to zoom a display of the client computing device on a particular portion of a plurality of portions of a content page, and wherein the zooming interaction is performed independently of any content request;
      determine a popularity level of at least one portion of the plurality of portions of the content page, wherein the popularity level is based at least in part on a measure of zooming interactions, performed independently of content requests and processed exclusively at client computing devices, associated with the at least one portion relative to zooming interactions, performed independently of content requests and processed exclusively at client computing devices, associated with one or more other portions of the plurality of portions of the content page; and
      store, in an electronic data store, popularity data indicating the popularity level of the at least one portion.

2. The system of claim 1, wherein interaction data comprises at least one of a representation of the particular portion of the content page on which the display was zoomed, display coordinates of the particular portion of the content page on which the display was zoomed, or a layout tag associated with the particular portion of the content page on which the display was zoomed.

3. The system of claim 1, where the server is further operable to:
   determine a second content page that is related to the content page, wherein the determination based at least in part on interaction data associated with the content page and interaction data associated with the second content page; and
   transmit a network address of the second content page to a client computing device in response to a request for the content page.

4. The system of claim 3, wherein the server is further operable to receive navigation data from the plurality of client computing devices, wherein the navigation data indicates a previous content page from which a user navigated to the content page on which the user zoomed the display, and wherein determining the second content page related to the content page is based at least in part on the previous content page.

5. The system of claim 3, wherein the server is further operable to receive demographic data from the plurality of client computing devices, wherein demographic data indicates a characteristic of a user of a client computing device, and wherein determining the second content page related to the content page is based at least in part on the demographic data.

6. Non-transitory physical computer storage comprising instructions stored therein for implementing, in one or more processors, operations for identifying popular network content, the operations comprising:
displaying, to a user of a client computing device, a content page comprising a plurality of content items;
receiving, from the user, touch input indicating a portion of the content page on which to zoom display of the content page, the portion comprising at least one content item of the plurality of content items, wherein the touch input indicating the portion of the content page on which to zoom display is performed independently of any content request;
processing, exclusively at the client computing device, the touch input to zoom the display of the content page on the portion; and
transmitting interaction data to a network node, wherein the interaction data indicates the at least one content item on which the user zoomed the display of the content page independently of any content request.

7. The non-transitory physical computer storage of claim 6, wherein the interaction data comprises coordinates of the at least one content item on which the user zoomed the display.

8. The non-transitory physical computer storage of claim 6, wherein the interaction data comprises a representation of at least one content item on which the user zoomed the display.

9. The non-transitory physical computer storage of claim 6, wherein the interaction data comprises an identifier of at least one content item on which the user zoomed the display.

10. The non-transitory physical computer storage of claim 6, the operations further comprising transmitting navigation data to the network node, wherein the navigation data indicates a content page from which the user navigated to the content page on which the user zoomed the display.

11. The non-transitory physical computer storage of claim 6, the operations further comprising transmitting navigation data to the network node, wherein the navigation data indicates a content page to which the user navigated from the content page on which the user zoomed the display.

12. The non-transitory physical computer storage of claim 6, the operations further comprising transmitting demographic data to the network node, wherein the demographic data indicates a characteristic of the user.

13. The non-transitory physical computer storage of claim 6, the operations further comprising transmitting identification data to the network node, wherein the identification data comprises a unique identifier of the user.

14. The non-transitory physical computer storage of claim 6, the operations further comprising causing display of an input control to the user in response to the user indicating a portion of the content page on which to zoom the display, wherein user activation of the input control causes display of a related content page.

15. The non-transitory physical computer storage of claim 14, wherein the related content page is associated the content page and with a popularity rank that exceeds a threshold.

16. The non-transitory physical computer storage of claim 15, wherein a network address of the related content page is received from the network node prior to the user indicating at least one content item on which to zoom the display.

17. The non-transitory physical computer storage of claim 15, wherein a network address of the related content page is received from the network node in response to transmitting the interaction data.

18. A computer-implemented method for assessing popularity levels of network content, the computer-implemented method comprising:
as implemented by one or more server computing devices configured to execute specific instructions,
receiving, from mobile computing devices of a plurality of users, interaction data reflective of zooming actions performed by said users on a network-accessible content page, wherein the network-accessible content page comprises a plurality of content items, and wherein the zooming actions are processed exclusively at the mobile computing devices and do not cause content to be requested from a server;
calculating respective popularity levels of each of the plurality of content items, the respective popularity levels calculated based at least on the zooming actions that do not cause content to be requested from a server and that are processed exclusively at the mobile computing devices; and
storing popularity data indicating the popularity level of at least one of the content items in an electronic data store.

19. The computer-implemented method of claim 18, wherein the popularity data indicates that a first content item of the at least one of the content items is associated with the highest popularity level of the plurality of content items of the content page.

20. The computer-implemented method of claim 18, further comprising receiving eye movement data reflective of eye movements of said users when viewing the content page, wherein calculating the popularity levels is further based at least in part on the eye movement data.

21. The computer-implemented method of claim 18, wherein a popularity level of a content item is calculated relative to the popularity levels of other content items of the content page.

22. The computer-implemented method of claim 18, further comprising providing related content data to mobile computing devices, the related content data indicating a content page related to a content item having a popularity level exceeding a threshold.

23. The computer-implemented method of claim 18, further comprising receiving demographic data reflective of characteristics of said plurality of users.

24. The computer-implemented method of claim 23, wherein calculating respective popularity levels is further based at least in part on the demographic data.

25. The computer-implemented method of claim 23, further comprising determining a content page related to a content item based at least in part on the demographic data.

26. The computer-implemented method of claim 18, further comprising receiving navigation data reflective of network-accessible content pages previously accessed by said plurality of users.

27. The computer-implemented method of claim 26, wherein calculating respective popularity levels is further based at least in part on the navigation data.

28. The computer-implemented method of claim 26, further comprising determining a content page related to a content item based at least in part on the navigation data.

29. The computer-implemented method of claim 18, wherein the popularity level of at least one content item of the plurality of content items is calculated based at least in part on a measure zooming actions associated with the at least one content item relative to zooming actions associated with one or more other content items of the plurality of content items.

\* \* \* \* \*